US011010998B1

(12) United States Patent
Dolgov et al.

(10) Patent No.: US 11,010,998 B1
(45) Date of Patent: May 18, 2021

(54) SYSTEMS AND METHODS FOR VEHICLES WITH LIMITED DESTINATION ABILITY

(71) Applicant: Waymo LLC, Mountain View, CA (US)

(72) Inventors: Dmitri A Dolgov, Mountain View, CA (US); Sebastian Thrun, Los Altos Hills, CA (US); Luis Ricardo Prada Gomez, Hayward, CA (US); Christopher Paul Urmson, Mountain View, CA (US); Nathaniel Fairfield, Mountain View, CA (US); Anthony Scott Levandowski, Berkeley, CA (US)

(73) Assignee: Waymo LLC, Mountain View, CA (US)

( * ) Notice: Subject to any disclaimer, the term of this patent is extended or adjusted under 35 U.S.C. 154(b) by 129 days.

(21) Appl. No.: 16/363,224

(22) Filed: Mar. 25, 2019

Related U.S. Application Data

(63) Continuation of application No. 13/800,050, filed on Mar. 13, 2013, now abandoned, which is a
(Continued)

(51) Int. Cl.
*G07C 9/00* (2020.01)
*G05D 1/02* (2020.01)
(Continued)

(52) U.S. Cl.
CPC ....... *G07C 9/00563* (2013.01); *G05D 1/0212* (2013.01); *G06Q 10/02* (2013.01);
(Continued)

(58) Field of Classification Search
CPC .... G06Q 10/02; G06Q 30/02; G06Q 30/0207; G06Q 40/08; G06Q 10/0635;
(Continued)

(56) References Cited

U.S. PATENT DOCUMENTS

| 1,924,984 | A | * | 8/1933 | Fageol | B60G 5/053 |
| | | | | | 180/24.13 |
| 3,186,508 | A | * | 6/1965 | Lamont | G01N 33/4972 |
| | | | | | 180/272 |

(Continued)

FOREIGN PATENT DOCUMENTS

| CN | 101073018 A | 11/2007 |
| CN | 101364111 A | 2/2009 |

(Continued)

OTHER PUBLICATIONS

Extended European Search Report for EP Application No. 18211931.3 dated Jun. 25, 2019, 14 pages.
(Continued)

*Primary Examiner* — Alexander G Kalinowski
*Assistant Examiner* — Sanjeev Malhotra
(74) *Attorney, Agent, or Firm* — Botos Churchill IP Law

(57) ABSTRACT

Aspects of the present disclosure relate generally to limiting the use of an autonomous or semi-autonomous vehicle by particular occupants based on permission data. More specifically, permission data may include destinations, routes, and/or other information that is predefined or set by a third party. The vehicle may then access the permission data in order to transport the particular occupant to the predefined destination, for example, without deviation from the predefined route. The vehicle may drop the particular occupant off at the destination and may wait until the passenger is ready to move to another predefined destination. The permission data may be used to limit the ability of the particular occupant to change the route of the vehicle completely or by some maximum deviation value. For example, the vehicle may be able to deviate from the route up to a particular distance from or along the route.

20 Claims, 13 Drawing Sheets

Related U.S. Application Data continuation of application No. 13/218,756, filed on Aug. 26, 2011, now Pat. No. 8,688,306.

(60) Provisional application No. 61/391,271, filed on Oct. 8, 2010, provisional application No. 61/390,094, filed on Oct. 5, 2010.

(51) Int. Cl.
  *G06Q 30/02* (2012.01)
  *G06Q 10/02* (2012.01)
  *G06Q 40/08* (2012.01)

(52) U.S. Cl.
  CPC ......... *G06Q 30/02* (2013.01); *G06Q 30/0207* (2013.01); *G06Q 40/08* (2013.01)

(58) Field of Classification Search
  CPC ... G06Q 10/08; G06Q 30/0601; B60W 10/06; B60W 10/08; B60W 20/00; B60W 2510/0638; B60R 25/04; B60R 25/24; B60R 2325/205; B60R 25/00; B60R 25/045; B60R 25/33; G01C 21/26; G01C 21/20; G01C 21/3438; G01C 21/3461; G01C 21/3407; G01C 21/343; G08G 1/096811; G08G 1/096816; G08G 1/096838; G08G 1/096844; G08G 1/127; G08G 1/202; G08G 1/205; H02K 1/34; H02K 33/16; H02K 3/38; H02K 7/14; B60L 2240/441; B60T 1/10; B62D 1/265; F02N 11/0818; F02N 2200/022; H04M 1/575; H04M 2242/22; H04M 2250/10; H04M 3/42; H04M 3/42042; H04M 3/42093; H04W 4/029; H04W 4/40
  USPC ..... 701/22, 23, 36, 103, 469, 472, 532, 533; 705/4, 6, 7.12, 7.14, 13, 26.1, 28; 180/24.12, 24.13, 165, 271, 272; 474/135; 290/40 C; 340/3.1, 5.1, 5.72, 340/5.82, 471; 125/12; 60/602; 114/106; 303/149; 715/768, 849; 192/85.63; 104/250; 123/179.3, 179.4; 379/201.06; 455/404.2, 411, 456.1, 457; 342/357.52
  See application file for complete search history.

(56) References Cited

U.S. PATENT DOCUMENTS

| | | | |
|---|---|---|---|
| 3,324,805 A * | 6/1967 | Mulch | E04H 6/30 104/250 |
| 3,411,139 A | 11/1968 | Lynch et al. | |
| 3,596,728 A * | 8/1971 | Neville | B60K 17/34 180/24.12 |
| 4,372,414 A * | 2/1983 | Anderson | B60K 6/12 180/165 |
| 4,387,783 A * | 6/1983 | Carman | B60K 6/12 180/165 |
| 4,656,834 A * | 4/1987 | Elpern | F02B 37/186 60/602 |
| 4,924,795 A * | 5/1990 | Ottemann | B63H 9/1028 114/106 |
| 4,970,653 A | 11/1990 | Kenue | |
| 4,982,072 A * | 1/1991 | Takigami | B60R 25/04 235/382 |
| 5,187,666 A | 2/1993 | Watanabe | |
| 5,415,468 A * | 5/1995 | Latarnik | B60T 8/1764 303/149 |
| 5,448,487 A | 9/1995 | Arai | |
| 5,470,134 A | 11/1995 | Toepfer et al. | |
| 5,521,579 A | 5/1996 | Bernhard | |
| 5,684,696 A | 11/1997 | Rao et al. | |
| 5,774,069 A | 6/1998 | Tanaka et al. | |
| 5,790,403 A | 8/1998 | Nakayama | |
| 5,906,645 A | 5/1999 | Kagawa et al. | |
| 5,913,376 A | 7/1999 | Takei | |
| 5,954,781 A | 9/1999 | Slepian et al. | |
| 6,055,042 A | 4/2000 | Sarangapani | |
| 6,064,926 A | 5/2000 | Sarangapani et al. | |
| 6,070,682 A | 6/2000 | Isogai et al. | |
| 6,151,539 A | 11/2000 | Bergholz et al. | |
| 6,195,610 B1 | 2/2001 | Kaneko | |
| 6,226,570 B1 | 5/2001 | Hahn | |
| 6,321,147 B1 | 11/2001 | Takeda et al. | |
| 6,332,354 B1 | 12/2001 | Lalor et al. | |
| 6,343,247 B2 | 1/2002 | Jitsukata et al. | |
| 6,385,539 B1 | 5/2002 | Wilson et al. | |
| 6,414,635 B1 | 7/2002 | Stewart et al. | |
| 6,438,472 B1 | 8/2002 | Tano et al. | |
| 6,438,491 B1 | 8/2002 | Farmer | |
| 6,453,056 B2 | 9/2002 | Laumeyer et al. | |
| 6,470,874 B1 * | 10/2002 | Mertes | B23D 47/12 125/12 |
| 6,504,259 B1 * | 1/2003 | Kuroda | B60L 58/20 290/40 C |
| 6,516,262 B2 | 2/2003 | Takenaga et al. | |
| 6,560,529 B1 | 5/2003 | Janssen | |
| 6,591,172 B2 | 7/2003 | Oda et al. | |
| 6,606,557 B2 | 8/2003 | Kotzin | |
| 6,643,576 B1 | 11/2003 | O Connor et al. | |
| 6,832,156 B2 | 12/2004 | Farmer | |
| 6,836,719 B2 | 12/2004 | Andersson et al. | |
| 6,847,869 B2 | 1/2005 | Dewberry et al. | |
| 6,859,009 B2 | 2/2005 | Jablin | |
| 6,862,524 B1 * | 3/2005 | Nagda | G01C 21/3492 340/988 |
| 6,876,908 B2 | 4/2005 | Cramer et al. | |
| 6,934,613 B2 | 8/2005 | Yun | |
| 6,963,657 B1 | 11/2005 | Nishigaki et al. | |
| 7,011,186 B2 | 3/2006 | Frentz et al. | |
| 7,031,829 B2 | 4/2006 | Nisiyama | |
| 7,085,633 B2 | 8/2006 | Nishira et al. | |
| 7,102,496 B1 | 9/2006 | Ernst, Jr. et al. | |
| 7,177,760 B2 | 2/2007 | Kudo | |
| 7,194,347 B2 | 3/2007 | Harumoto et al. | |
| 7,207,304 B2 * | 4/2007 | Iwatsuki | B60W 10/06 123/179.3 |
| 7,233,861 B2 | 6/2007 | Van Buer et al. | |
| 7,327,242 B2 | 2/2008 | Holloway et al. | |
| 7,340,332 B2 * | 3/2008 | Underdahl | B60R 25/00 701/29.3 |
| 7,346,439 B2 | 3/2008 | Bodin | |
| 7,373,237 B2 | 5/2008 | Wagner et al. | |
| 7,394,046 B2 | 7/2008 | Olsson et al. | |
| 7,486,802 B2 | 2/2009 | Hougen | |
| 7,499,774 B2 | 3/2009 | Barrett et al. | |
| 7,499,776 B2 | 3/2009 | Allard et al. | |
| 7,499,804 B2 | 3/2009 | Svendsen et al. | |
| 7,515,101 B1 | 4/2009 | Bhogal et al. | |
| 7,565,241 B2 | 7/2009 | Tauchi | |
| 7,579,942 B2 | 8/2009 | Kalik | |
| 7,656,280 B2 | 2/2010 | Hines et al. | |
| 7,694,555 B2 | 4/2010 | Howell et al. | |
| 7,778,759 B2 | 8/2010 | Tange et al. | |
| 7,818,124 B2 | 10/2010 | Herbst et al. | |
| 7,835,859 B2 | 11/2010 | Bill | |
| 7,865,277 B1 | 1/2011 | Larson et al. | |
| 7,894,951 B2 | 2/2011 | Norris et al. | |
| 7,908,040 B2 | 3/2011 | Howard et al. | |
| 7,956,730 B2 | 6/2011 | White et al. | |
| 7,979,175 B2 | 7/2011 | Allard et al. | |
| 8,024,102 B2 | 9/2011 | Swoboda et al. | |
| 8,050,863 B2 | 11/2011 | Trepagnier et al. | |
| 8,078,349 B1 | 12/2011 | Prada Gomez et al. | |
| 8,095,313 B1 | 1/2012 | Blackburn | |
| 8,099,213 B2 | 1/2012 | Zhang et al. | |
| 8,126,642 B2 | 2/2012 | Trepagnier et al. | |
| 8,190,322 B2 | 5/2012 | Lin et al. | |
| 8,194,927 B2 | 6/2012 | Zhang et al. | |
| 8,195,341 B2 | 6/2012 | Huang et al. | |

(56) References Cited

U.S. PATENT DOCUMENTS

| | | |
|---|---|---|
| 8,244,408 B2 | 8/2012 | Lee et al. |
| 8,244,458 B1 | 8/2012 | Blackburn |
| 8,260,515 B2 | 9/2012 | Huang et al. |
| 8,280,601 B2 | 10/2012 | Huang et al. |
| 8,280,623 B2 | 10/2012 | Trepagnier et al. |
| 8,311,274 B2 | 11/2012 | Bergmann et al. |
| 8,352,111 B2 | 1/2013 | Mudalige |
| 8,352,112 B2 | 1/2013 | Mudalige |
| 8,368,558 B2 | 2/2013 | Salowitz |
| 8,412,449 B2 | 4/2013 | Trepagnier et al. |
| 8,452,506 B2 | 5/2013 | Groult |
| 8,457,827 B1 | 6/2013 | Ferguson et al. |
| 8,634,980 B1 | 1/2014 | Urmson et al. |
| 8,694,236 B2 | 4/2014 | Takagi |
| 8,706,394 B2 | 4/2014 | Trepagnier et al. |
| 8,718,861 B1 | 5/2014 | Montemerlo et al. |
| 8,724,093 B2 | 5/2014 | Sakai et al. |
| 8,775,063 B2 | 7/2014 | Zeng |
| 8,831,813 B1 | 9/2014 | Ferguson et al. |
| 8,855,860 B2 | 10/2014 | Isaji et al. |
| 8,874,267 B1 | 10/2014 | Dolgov et al. |
| 8,880,270 B1 | 11/2014 | Ferguson et al. |
| 8,918,277 B2 | 12/2014 | Niem et al. |
| 8,929,604 B2 | 1/2015 | Platonov et al. |
| 8,948,954 B1 | 2/2015 | Ferguson et al. |
| 8,949,016 B1 | 2/2015 | Ferguson et al. |
| 8,970,397 B2 | 3/2015 | Nitanda et al. |
| 8,972,093 B2 | 3/2015 | Josh |
| 9,008,369 B2 | 4/2015 | Schofield et al. |
| 9,062,979 B1 | 6/2015 | Ferguson et al. |
| 9,063,548 B1 | 6/2015 | Ferguson et al. |
| 9,081,383 B1 | 7/2015 | Montemerlo et al. |
| 9,182,759 B2 | 11/2015 | Wimmer et al. |
| 9,248,834 B1 | 2/2016 | Ferguson et al. |
| 9,669,827 B1 | 6/2017 | Ferguson et al. |
| 9,811,085 B1 | 11/2017 | Hayes |
| 9,914,452 B1 | 3/2018 | Ferguson et al. |
| 10,372,129 B1 | 8/2019 | Urmson et al. |
| 2001/0024095 A1 | 9/2001 | Fitzgibbon et al. |
| 2001/0037927 A1* | 11/2001 | Nagler .................. F16D 25/14 192/85.63 |
| 2002/0188499 A1* | 12/2002 | Jenkins ............... G06Q 10/087 705/28 |
| 2003/0014302 A1* | 1/2003 | Jablin .................. G06Q 10/10 705/13 |
| 2003/0016804 A1* | 1/2003 | Sheha ................. G01C 21/26 379/201.06 |
| 2003/0037977 A1 | 2/2003 | Tatara et al. |
| 2003/0055554 A1* | 3/2003 | Shioda ............ G08G 1/096811 701/533 |
| 2003/0125963 A1* | 7/2003 | Haken ................ H04L 29/06 705/26.1 |
| 2005/0012589 A1* | 1/2005 | Kokubu ............... G08G 1/207 340/5.1 |
| 2005/0099146 A1 | 5/2005 | Nishikawa et al. |
| 2005/0125154 A1 | 6/2005 | Kawasaki |
| 2005/0131645 A1* | 6/2005 | Panopoulos ......... G05D 1/0244 701/472 |
| 2005/0149251 A1 | 7/2005 | Donath et al. |
| 2005/0216184 A1* | 9/2005 | Ehlers .............. G08G 1/096811 455/404.2 |
| 2005/0273251 A1* | 12/2005 | Nix ................... G01C 21/3611 701/533 |
| 2006/0037573 A1* | 2/2006 | Iwatsuki ............... B60W 10/06 123/179.4 |
| 2006/0082437 A1* | 4/2006 | Yuhara .................. B60R 25/04 340/5.82 |
| 2006/0089765 A1 | 4/2006 | Pack et al. |
| 2006/0089800 A1 | 4/2006 | Svendsen et al. |
| 2006/0116801 A1 | 6/2006 | Shirley et al. |
| 2006/0173841 A1 | 8/2006 | Bill et al. |
| 2006/0178240 A1* | 8/2006 | Hansel ..................... F01L 1/02 474/135 |
| 2006/0276942 A1* | 12/2006 | Anderson ............ G07C 5/0858 701/33.4 |
| 2007/0010942 A1 | 1/2007 | Bill |
| 2007/0024501 A1* | 2/2007 | Yeh ........................ G01S 19/14 342/357.52 |
| 2007/0112477 A1 | 5/2007 | Van et al. |
| 2007/0142992 A1 | 6/2007 | Gronau et al. |
| 2007/0149214 A1* | 6/2007 | Walsh .................... H04L 67/18 455/456.1 |
| 2007/0165910 A1 | 7/2007 | Nagaoka et al. |
| 2007/0193798 A1 | 8/2007 | Allard et al. |
| 2007/0203617 A1 | 8/2007 | Haug |
| 2007/0225909 A1* | 9/2007 | Sakano .................. G01C 21/00 701/532 |
| 2007/0239331 A1 | 10/2007 | Kaplan |
| 2007/0247281 A1* | 10/2007 | Shimomura ........ B60R 25/2018 340/5.72 |
| 2007/0279250 A1 | 12/2007 | Kume et al. |
| 2008/0021628 A1 | 1/2008 | Tryon |
| 2008/0033615 A1 | 2/2008 | Khajepour et al. |
| 2008/0039991 A1 | 2/2008 | May et al. |
| 2008/0040039 A1 | 2/2008 | Takagi |
| 2008/0056535 A1 | 3/2008 | Bergmann et al. |
| 2008/0059015 A1 | 3/2008 | Whittaker et al. |
| 2008/0059048 A1* | 3/2008 | Kessler ................. F02D 41/009 701/103 |
| 2008/0084283 A1 | 4/2008 | Kalik |
| 2008/0089556 A1 | 4/2008 | Salgian et al. |
| 2008/0120025 A1 | 5/2008 | Naitou et al. |
| 2008/0120171 A1 | 5/2008 | Ikeuchi et al. |
| 2008/0147253 A1 | 6/2008 | Breed |
| 2008/0161987 A1 | 7/2008 | Breed |
| 2008/0167771 A1 | 7/2008 | Whittaker et al. |
| 2008/0183512 A1* | 7/2008 | Benzinger ............ G06Q 10/025 705/6 |
| 2008/0188246 A1* | 8/2008 | Sheha ..................... H04M 3/42 455/457 |
| 2008/0195268 A1 | 8/2008 | Sapilewski et al. |
| 2008/0277183 A1* | 11/2008 | Huang .................... B60R 25/33 180/271 |
| 2008/0303696 A1 | 12/2008 | Aso et al. |
| 2008/0306969 A1 | 12/2008 | Mehta et al. |
| 2009/0005959 A1 | 1/2009 | Bargman et al. |
| 2009/0010494 A1 | 1/2009 | Bechtel et al. |
| 2009/0074249 A1 | 3/2009 | Moed et al. |
| 2009/0082879 A1 | 3/2009 | Dooley et al. |
| 2009/0115594 A1* | 5/2009 | Han ........................ H04Q 9/00 340/471 |
| 2009/0150489 A1 | 6/2009 | Davis |
| 2009/0164071 A1 | 6/2009 | Takeda |
| 2009/0198400 A1 | 8/2009 | Allard et al. |
| 2009/0248231 A1* | 10/2009 | Kamiya ............... G05D 1/0061 701/23 |
| 2009/0276154 A1* | 11/2009 | Subramanian ......... G01C 21/20 701/469 |
| 2009/0287367 A1 | 11/2009 | Salinger |
| 2009/0287368 A1 | 11/2009 | Bonne |
| 2009/0306834 A1 | 12/2009 | Hjelm et al. |
| 2009/0313077 A1* | 12/2009 | Wheeler, IV .. G06Q 10/063112 705/7.14 |
| 2009/0313095 A1* | 12/2009 | Hurpin .................. G06Q 20/127 705/13 |
| 2009/0319096 A1 | 12/2009 | Offer et al. |
| 2009/0319112 A1 | 12/2009 | Fregene et al. |
| 2009/0322872 A1 | 12/2009 | Muehlmann et al. |
| 2009/0326799 A1* | 12/2009 | Crook ..................... G06Q 30/02 701/533 |
| 2010/0010699 A1 | 1/2010 | Taguchi et al. |
| 2010/0014714 A1 | 1/2010 | Zhang et al. |
| 2010/0017056 A1* | 1/2010 | Asakura ................. B60R 25/045 701/36 |
| 2010/0042282 A1 | 2/2010 | Taguchi et al. |
| 2010/0052945 A1 | 3/2010 | Breed |
| 2010/0066587 A1 | 3/2010 | Yamauchi et al. |
| 2010/0076640 A1 | 3/2010 | Maekawa et al. |
| 2010/0079590 A1 | 4/2010 | Kuehnle et al. |
| 2010/0179715 A1 | 7/2010 | Puddy |
| 2010/0179720 A1 | 7/2010 | Lin et al. |

(56) References Cited

U.S. PATENT DOCUMENTS

| | | |
|---|---|---|
| 2010/0191433 A1 | 7/2010 | Groult |
| 2010/0198491 A1 | 8/2010 | Mays |
| 2010/0205132 A1 | 8/2010 | Taguchi et al. |
| 2010/0207787 A1 | 8/2010 | Catten et al. |
| 2010/0228419 A1 | 9/2010 | Lee et al. |
| 2010/0241297 A1* | 9/2010 | Aoki ................ B60W 30/18 701/22 |
| 2010/0253542 A1 | 10/2010 | Seder et al. |
| 2010/0256836 A1 | 10/2010 | Mudalige |
| 2010/0265354 A1 | 10/2010 | Kameyama |
| 2011/0010131 A1 | 1/2011 | Miyajima et al. |
| 2011/0040481 A1 | 2/2011 | Trombley et al. |
| 2011/0071718 A1 | 3/2011 | Norris et al. |
| 2011/0099040 A1* | 4/2011 | Felt .................. H04W 4/025 705/7.12 |
| 2011/0137520 A1 | 6/2011 | Rector et al. |
| 2011/0150348 A1 | 6/2011 | Anderson |
| 2011/0206273 A1 | 8/2011 | Plagemann et al. |
| 2011/0210866 A1 | 9/2011 | David et al. |
| 2011/0213511 A1 | 9/2011 | Visconti et al. |
| 2011/0239146 A1* | 9/2011 | Dutta ................ G06Q 10/109 715/768 |
| 2011/0246156 A1 | 10/2011 | Zecha et al. |
| 2011/0254655 A1* | 10/2011 | Maalouf ............. G09B 9/04 340/3.1 |
| 2011/0264317 A1 | 10/2011 | Druenert et al. |
| 2012/0053775 A1 | 3/2012 | Nettleton et al. |
| 2012/0069185 A1 | 3/2012 | Stein |
| 2012/0078723 A1 | 3/2012 | Stewart |
| 2012/0083960 A1 | 4/2012 | Zhu et al. |
| 2012/0114178 A1 | 5/2012 | Platonov et al. |
| 2012/0157052 A1* | 6/2012 | Quade ................ H04L 63/107 455/411 |
| 2012/0271483 A1 | 10/2012 | Samukawa et al. |
| 2012/0277947 A1 | 11/2012 | Boehringer et al. |
| 2012/0283912 A1 | 11/2012 | Lee et al. |
| 2012/0314070 A1 | 12/2012 | Zhang et al. |
| 2013/0035821 A1 | 2/2013 | Bonne et al. |
| 2013/0054049 A1 | 2/2013 | Uno |
| 2013/0054106 A1 | 2/2013 | Schmudderich et al. |
| 2013/0054128 A1 | 2/2013 | Moshchuk et al. |
| 2013/0061181 A1* | 3/2013 | Arrasvuori .......... G06F 3/04815 715/849 |
| 2013/0144520 A1 | 6/2013 | Ricci |
| 2013/0166206 A1 | 6/2013 | Nagase |
| 2013/0179382 A1 | 7/2013 | Fritsh et al. |
| 2013/0282277 A1 | 10/2013 | Rubin et al. |
| 2013/0321400 A1 | 12/2013 | Van Os et al. |
| 2013/0321422 A1 | 12/2013 | Pahwa et al. |
| 2014/0067187 A1 | 3/2014 | Ferguson et al. |
| 2014/0088855 A1 | 3/2014 | Ferguson et al. |
| 2014/0117933 A1 | 5/2014 | Nyu |
| 2014/0139369 A1 | 5/2014 | Baba |
| 2014/0156164 A1 | 6/2014 | Schuberth et al. |
| 2014/0180543 A1 | 6/2014 | Ueda et al. |
| 2014/0195138 A1 | 7/2014 | Stelzig et al. |
| 2014/0214255 A1 | 7/2014 | Dolgov et al. |
| 2014/0309870 A1 | 10/2014 | Ricci |
| 2014/0350836 A1 | 11/2014 | Stettner et al. |
| 2014/0369168 A1 | 12/2014 | Max et al. |
| 2015/0112571 A1 | 4/2015 | Schmudderich |
| 2015/0153735 A1 | 6/2015 | Clarke et al. |
| 2015/0177007 A1 | 6/2015 | Su et al. |
| 2015/0198951 A1 | 7/2015 | Thor et al. |
| 2015/0203107 A1 | 7/2015 | Lippman et al. |
| 2015/0293216 A1 | 10/2015 | O'Dea et al. |
| 2015/0302751 A1 | 10/2015 | Strauss et al. |
| 2016/0086285 A1* | 3/2016 | Jordan Peters .. G08G 1/096827 705/4 |
| 2016/0170998 A1 | 6/2016 | Frank |
| 2016/0171620 A1* | 6/2016 | Bogovich ............. G06Q 40/08 705/4 |
| 2016/0327947 A1 | 11/2016 | Ishikawa et al. |
| 2016/0334230 A1 | 11/2016 | Ross et al. |
| 2016/0334797 A1 | 11/2016 | Ross et al. |
| 2017/0098176 A1 | 4/2017 | Hirose |
| 2017/0337571 A1 | 11/2017 | Bansal |
| 2017/0370735 A1 | 12/2017 | Salowitz |
| 2018/0189918 A1 | 7/2018 | Lu |
| 2018/0238705 A1 | 8/2018 | O'Herlihy |

FOREIGN PATENT DOCUMENTS

| | | | |
|---|---|---|---|
| CN | 101522493 A | 9/2009 | |
| DE | 10052816 A1 | 5/2002 | |
| DE | 10218010 A1 | 11/2003 | |
| DE | 10336986 A1 | 3/2005 | |
| DE | 102008014771 A1 | 9/2009 | |
| DE | 102009010006 A1 | 10/2009 | |
| DE | 102008023380 A1 | 11/2009 | |
| EP | 0884666 A1 | 12/1998 | |
| EP | 2042405 A | 4/2009 | |
| EP | 2060455 A1 | 5/2009 | |
| EP | 2216225 A1 | 8/2010 | |
| FR | 2692064 A1 | 12/1993 | |
| FR | 2692064 A1 * | 12/1993 | ............ B62D 1/265 |
| JP | H05246635 | 9/1993 | |
| JP | H08110998 | 4/1996 | |
| JP | 09160643 A | 6/1997 | |
| JP | H09-161196 A | 6/1997 | |
| JP | H09166209 | 6/1997 | |
| JP | 09-066853 A | 11/1997 | |
| JP | 11-39598 A | 2/1999 | |
| JP | 11282530 A | 10/1999 | |
| JP | 2000149188 A | 5/2000 | |
| JP | 2000305625 A | 11/2000 | |
| JP | 2000-38008 A | 12/2000 | |
| JP | 2000338008 A | 12/2000 | |
| JP | 2001101599 A | 4/2001 | |
| JP | 2002236993 A | 8/2002 | |
| JP | 2002251690 A | 9/2002 | |
| JP | 2003081039 A | 3/2003 | |
| JP | 2003162799 A | 6/2003 | |
| JP | 2003-205804 A | 7/2003 | |
| JP | 2004-206510 A | 7/2004 | |
| JP | 2004-326730 A | 11/2004 | |
| JP | 2004345862 | 12/2004 | |
| JP | 2005062912 | 3/2005 | |
| JP | 2005067483 A | 3/2005 | |
| JP | 2005071114 A | 3/2005 | |
| JP | 2005297621 A | 10/2005 | |
| JP | 2006264530 A | 10/2006 | |
| JP | 2006322752 A | 11/2006 | |
| JP | 2007001475 A | 1/2007 | |
| JP | 2007-022135 A | 2/2007 | |
| JP | 2000-193471 A | 7/2007 | |
| JP | 2007331458 A | 12/2007 | |
| JP | 2008087545 A | 4/2008 | |
| JP | 2008117082 A | 5/2008 | |
| JP | 2008152655 A | 7/2008 | |
| JP | 2008170404 A | 7/2008 | |
| JP | 2008213581 A | 9/2008 | |
| JP | 2008257652 A | 10/2008 | |
| JP | 2008290680 A | 12/2008 | |
| JP | 2009026321 A | 2/2009 | |
| JP | 2009053925 A | 3/2009 | |
| JP | 2009075638 A | 4/2009 | |
| JP | 2010128637 A | 6/2010 | |
| JP | 2010-173530 A | 8/2010 | |
| JP | 2010182207 A | 8/2010 | |
| JP | 2010191803 A | 9/2010 | |
| JP | 2005339181 A | 12/2015 | |
| WO | 0070941 A1 | 11/2000 | |
| WO | 2001088827 A1 | 11/2001 | |
| WO | WO 01/88827 A1 | 11/2001 | |
| WO | 2005013235 A1 | 2/2005 | |
| WO | 2007145564 A1 | 12/2007 | |
| WO | 2009028558 A1 | 3/2009 | |

(56) References Cited

FOREIGN PATENT DOCUMENTS

| WO | 2009155228 A1 | 12/2009 |
|---|---|---|
| WO | 2011021046 A1 | 2/2011 |

OTHER PUBLICATIONS

"European Search Report received for European Patent Application No. EP18211931 dated Jun. 25, 2019", 14 pages.
"Extended European Search Report received for European Patent Application No. 11831362.6, dated Mar. 14, 2017", 11 pages.
"Extended European Search Report received for European Patent Application No. 11831503.5, dated Dec. 3, 2015", 14 pages.
"Notice of Preliminary Rejection received for Korean Patent Application No. 10-2013-7011657, dated Feb. 1, 2016", 10 pages (4 pages of English Translation and 6 pages of Official Copy).
"Notice of Reasons for Rejection received for Japanese Patent Application No. 2013-532909, dated May 26, 2016", 6 pages (3 pages of English Translation and 3 pages of Official Copy).
"Notice of reasons for rejection received for Japanese Patent Application No. 2013-532909, dated Nov. 25, 2015", 9 pages (5 pages of English Translation and 4 pages of Official Copy).
"Office Action received for Chinese Patent Application No. 201180057942.8, dated Jun. 3, 2015", 21 pages (14 pages of English Translation and 7 pages of Official Copy).
"Office Action received for Japanese Patent Application No. 2013-532908, dated Sep. 8, 2015", 12 pages (6 pages of English Translation and 6 pages of Official Copy).
"Partial Supplementary European Search Report received for European Patent Application No. 11831505.0, dated Dec. 20, 2016", 6 pages.
"TomTom GO user manual", Available online at: <http://download.tomtom.com/open/manuals/device/refman/TomTom-GO-en-GB.pdf>, Accessed on Oct. 1, 2007, 100 pages.
Jaffe, Eric, "The First Look at How Google's Self-Driving Car Handles City Streets", The Atlantic City Lab, Apr. 28, 2014, 16 pages.
Tiwari, et al., "Survival Analysis: Pedestrian Risk Exposure at Signalized Intersections", Trans Research Part F: Traffic Psych and Behav, Pergamon, Amsterdam, vol. 10, No. 2, 2007, pp. 77-89.

Partial European Search Report for Application No. EP18211931 dated Feb. 27, 2019.
"Fact Sheet: Beyond Traffic Signals: A Paradigm Shift Intersection Control for Autonomous Vehicles", Retrieved from the internet: <http://www.fhwa.dol.gov/advancedresearch/pubs/10023/index.Dcfm>, Apr. 27, 2011, 3 pages.
"Google Cars Drive Themselves, in Traffic", Retrieved from the internet: <http://www.nytimes.com/2010/10/science/10google.html on Aug. 19, 2011, 4 pages.
"International Search Report and the Written Opinion received for PCT Application No. PCT/US 2011/054154, dated Apr. 24, 2012", 9 pages.
"International Search Report and the Written Opinion received for PCT Application No. PCT/US2011/054896, dated Apr. 25, 2012", 8 pages.
"International Search Report and Written Opinion received for Application No. PCT/US2011/054899, dated May 4, 2012", 8 pages.
"International Search Report and Written Opinion received for PCT Application No. PCT/US2013/061604, dated Jul. 3, 2014", 10 pages.
"Office Action received for Chinese Patent Application No. 201180057954.0, dated Apr. 29, 2015", 14 pages. (8 pages of English Translation and 6 pages of Official Copy).
Crane, et al., "Team Gator Nation's Autonomous Vehicle Development for The 2007 DARPA Urban Challenge", Journal of Aerospace Computing, Information and Communication vol. 4,, Dec. 2007, pp. 1059-1085.
Di Leece, et al., "Experimental System to Support Real-Time Driving Pattern Recognition", 2008, pp. 1192-1199.
Guizzo, Eric, "How's Google's Self-Driving Car Works", retrieved at http:// spectrum .ieee .org/ automaton/robotics/artificial-intelligence/how-google-self-driving -car-works, on May 19, 2014, IEEE., 31 pages.
McNaughton, et al., "Motion Planning for Autonomous Driving with a Conformal Spatiotempral Lattice", international Conference on Robotics and Automation, May 9-13, 2011, pp. 4889-4895.
Sconhof, et al., "Autonomous Detection and Anticipation of Jam Fronts From Messages Propagated by Intervehicle Communication,", Journal of the Transportation Research Board, 2007.

\* cited by examiner

1200 Con't

SYSTEMS AND METHODS FOR VEHICLES WITH LIMITED DESTINATION ABILITY

CROSS-REFERENCE TO RELATED APPLICATION

The present application is a continuation of U.S. patent application Ser. No. 13/800,050, filed on Mar. 13, 2013, which is a continuation of U.S. patent application Ser. No. 13/218,756, filed on Aug. 26, 2011, now U.S. Pat. No. 8,688,306 issued on Apr. 1, 2014, which claims the benefit of U.S. Provisional Application No. 61/390,094, entitled "AUTONOMOUS VEHICLES," filed Oct. 5, 2010, and U.S. Provisional Application No. 61/391,271, entitled "AUTONOMOUS VEHICLES," filed Oct. 8, 2010, the entire disclosures of which are hereby incorporated herein by reference.

BACKGROUND

Autonomous vehicles use various computing systems to aid in the transport of passengers from one location to another. Some autonomous vehicles may require some initial input or continuous input from an operator, such as a pilot, driver, or passenger. Other systems, for example autopilot systems, may be used only when the system has been engaged, which permits the operator to switch from a manual mode (where the operator exercises a high degree of control over the movement of the vehicle) to an autonomous mode (where the vehicle essentially drives itself) to modes that lie somewhere in between (semi-autonomous).

Some non-autonomous vehicles may be equipped with features that allow the vehicle's owner to track the use of the vehicle. For example, vehicles with GPS tracking systems may allow an owner to track the use of the vehicle by third parties, such as children or employees. Some rental car agencies use software which charges a vehicle a premium if the vehicle is driven in certain areas.

These non-autonomous vehicles may also include features which directly limit the use of the vehicle. In some instances, an owner may remotely disable a vehicle which is being used in an unauthorized manner, for example, if the vehicle has been stolen or is involved in a pursuit with law enforcement. In another example, "valet" keys may be used to limit the maximum speed of a vehicle or access to particular areas of the vehicle when used by third parties.

BRIEF SUMMARY

One aspect of the disclosure provides a method. The method includes receiving information identifying a user and accessing stored profile data. The profile data has at least one user profile including user identification information, a permissible destination, and a predefined route between a current location of a vehicle and the permissible destination. The method also includes identifying the at least one user profile based on the stored user identification information and the received information identifying the user; receiving a destination; comparing, by a processor associated with the vehicle, the received destination to the permissible destination to determine whether the received destination is the same as the permissible destination; and when the received destination is the same as the permissible destination, enabling the user to use the vehicle to travel to the received destination.

In one example, the at least one profile further includes a maximum deviation value, and the method also includes determining whether the at least one user profile includes permission to deviate from the predefined route; when the at least one profile includes permission to deviate from the predefined route, calculating an alternate route between a current location of the vehicle and the received destination; calculating a deviation value for the alternate route based on a comparison of the alternate route to the predefined route; and comparing the deviation value to the maximum deviation value to determine whether the user has permission to follow the alternate route. In one alternative, the user is given permission to follow the alternate route when the deviation value is less than the maximum deviation valve, and the method also includes receiving a selected route of either the alternate route or the predefined route; and enabling the user to choose the selected route to the received destination.

In another example, the at least one profile includes at least one of a date and a time restriction, and the method further comprising, before receiving the received destination, determining whether the user presently has permission to use the vehicle based on the at least one of the date and the time restriction. In one alternative, the method also includes, when the user does not presently have permission, denying the user permission to use the vehicle. In another alternative, the method also includes, when the user does not presently have permission, enabling the user to use the vehicle in an emergency mode.

In another example, the at least one user profile further includes a restricted destination, and the method also includes, when the received destination is not the same as the permissible destination, comparing the received destination to the restricted destination to determine whether the received destination is the same as the restricted destination. In one alternative, the method also includes, when the received destination is the same as the restricted destination, denying the user permission to use the vehicle. In another alternative, the method also includes, when the received destination is the same as the restricted destination, enabling the user to use the vehicle in an emergency mode. In yet another alternative, the method also includes, when the received destination is the same as the restricted destination, requesting the user to provide a new destination. In this alternative, the method may also include comparing the new destination to the permissible destination to determine whether the received destination is the same as the permissible destination and when the new destination is the same as the permissible destination, enabling the user to use the vehicle to travel to the new destination.

In another example, the method also includes, as the vehicle travels to the received destination, monitoring whether the vehicle is deviating from the predefined route. In one alternative, the method also includes, when the vehicle deviates from the predefined route, presenting a warning to the user on a display of the vehicle. In another alternative, the method also includes, when the vehicle deviates from the predefined route, recording a log of the vehicle's movements and the user's actions in controlling the vehicle. In yet another alternative, the method also includes switching from a manual mode, where the user is able to control the movement of the vehicle, to an autonomous mode, where a processor of the vehicle controls the movements of the vehicle without input from the user. In still a further alternative, the at least one profile further includes a maximum deviation value, and the method also includes when the vehicle is deviating the predefined route, calculating a deviation value by comparing deviation of the vehicle with respect to the predefined route and comparing the deviation value to the maximum deviation value to determine whether the user has permission to continue to deviate from the predefined route.

Another aspect of the disclosure provides a device. The device includes memory storing profile data. The profile data has at least one user profile including user identification information, a permissible destination, and a predefined route between a current location of a vehicle and the permissible destination. The device also includes a processor coupled to the memory. The processor is operable to receive information identifying a user; identify the at least one user profile based on the stored user identification information and the received information identifying the user; receive a destination; compare the received destination to the permissible destination to determine whether the received destination is the same as the permissible destination; and when the received destination is the same as the permissible destination, enabling the user to use the vehicle to travel to the received destination.

In one example, the at least one profile further includes a maximum deviation value, and the processor is also operable to determine whether the at least one user profile includes permission to deviate from the predefined route; when the at least one profile includes then permission to deviate from the predefined route, calculate an alternate route between a current location of the vehicle and the received destination; calculate a deviation value for the alternate route based on a comparison of the alternate route to the predefined route; and compare the deviation value to the maximum deviation value to determine whether the user has permission to follow the alternate route. In one alternative, the user is given permission to follow the alternate route when the deviation value is less than the maximum deviation valve, and the processor is also operable to receive a selected route of either the alternate route or the predefined route and enable the user to choose the selected route to the received destination.

A further aspect of the disclosure provides a tangible, non-transitory computer-readable storage medium on which computer readable instructions of a program are stored, the instructions, when executed by a processor, cause the processor to perform a method. The method includes receiving information identifying a user; accessing stored profile data, the profile data having at least one user profile, the at least one user profile including user identification information, a permissible destination, and a predefined route between a current location of a vehicle and the permissible destination; identifying the at least one user profile based on the stored user identification information and the received information identifying the user; receiving a destination; comparing the received destination to the permissible destination to determine whether the received destination is the same as the permissible destination; and when the received destination is the same as the permissible destination, enabling the user to use the vehicle to travel to the received destination.

In one example, the method also includes, as the vehicle travels to the received destination, monitoring whether the vehicle is deviating from the predefined route. In one alternative, the method also includes, when the vehicle deviates from the predefined route, presenting a warning to the user on a display of the vehicle. In another alternative, the method also includes, when the vehicle deviates from the predefined route, recording a log of the vehicle's movements and the user's actions in controlling the vehicle. In yet another alternative, the method also includes switching from a manual mode, where the user is able to control the movement of the vehicle, to an autonomous mode, where a processor of the vehicle controls the movements of the vehicle without input from the user. In a further alternative, the at least one profile further includes a maximum deviation value, and the method also includes, when the vehicle is deviating the predefined route, calculating a deviation value by comparing deviation of the vehicle with respect to the predefined route and comparing the deviation value to the maximum deviation value to determine whether the user has permission to continue to deviate from the predefined route.

DETAILED DESCRIPTION

Figure 1:
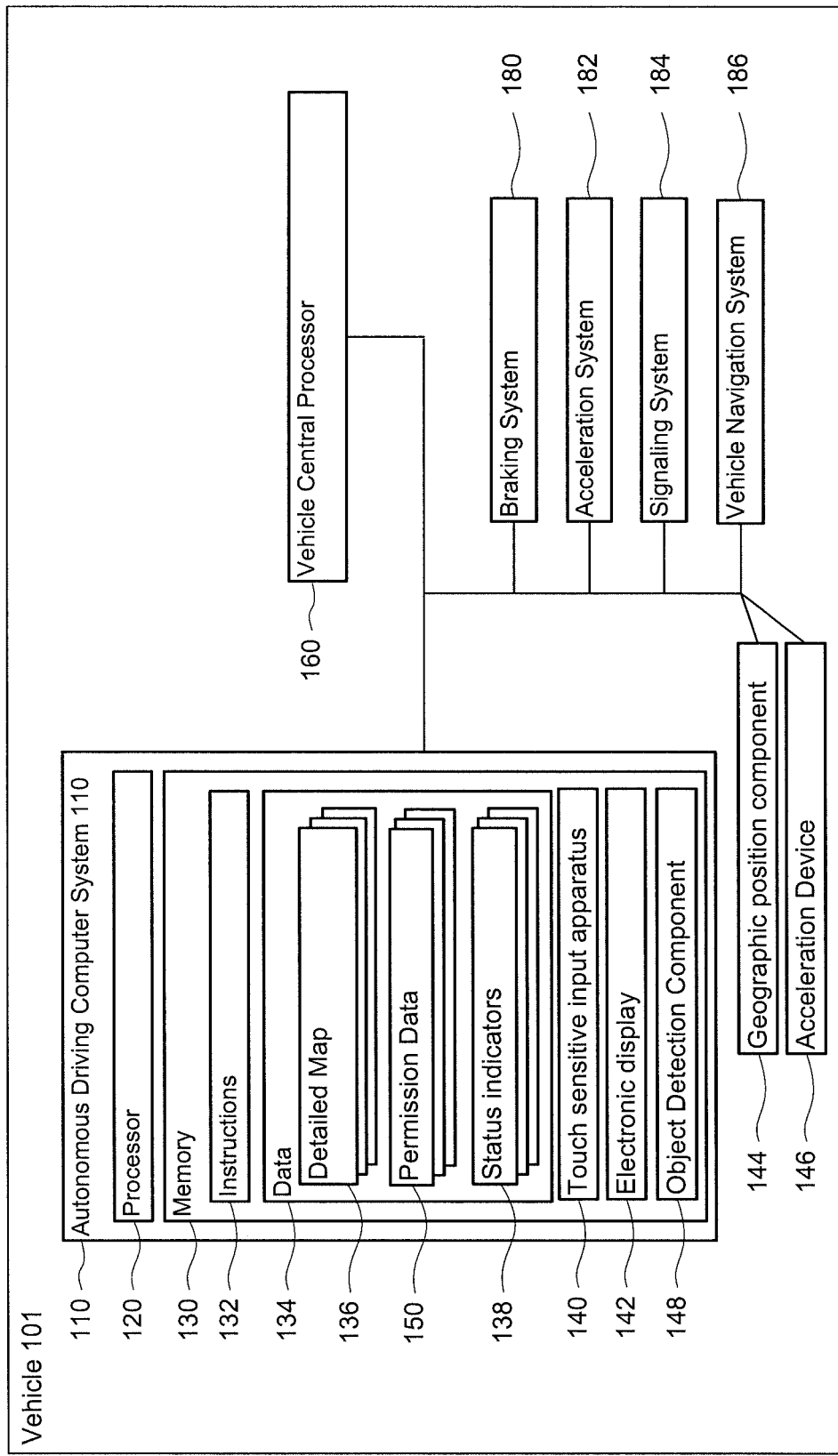
FIG. 1 is a functional diagram of a system in accordance with an embodiment.

In one aspect of the disclosure, a vehicle's autonomous driving computer may receive profile data for a user. The profile data may be provided by an authorized administrator such as parent, guardian, law enforcement representative, etc. and may define the access rights and permissions of the user with respect to the vehicle. The profile data may be stored in memory accessible by the autonomous driving computer. Later, the vehicle may receive information identifying a user. For example, the user may present an identification card, biometric information, or other identifier.

In response to receiving the identifying information, the autonomous driving computer may access the memory to determine whether the identifying information is associated with a particular user profile. If not, the autonomous driving computer may deny the user the ability to use the vehicle or may allow the user to operate the vehicle in an emergency mode to transport the user to a hospital, home, to a police or fire station, etc.

If a user profile is identified, the autonomous driving computer may determine whether the user currently has permission to use the vehicle. For example, the autonomous driving computer may determine whether there are any date and/or time restrictions and if so, whether they indicate that the user currently has permission to use the vehicle. If not, the autonomous driving computer may deny the user the ability to use the vehicle or may allow the user to operate the vehicle in the emergency mode.

If the user does have permission to use the vehicle, or if there are no particular date and/or time restrictions, the user may provide a destination. This destination may be provided to the autonomous driving computer. The autonomous driving computer may then determine, based on the identified profile, whether the destination is a permissible destination. If not, the vehicle may display a denial or warning message.

The vehicle may allow the user to submit another destination. If the user does not submit a new destination, the autonomous driving computer may deny the user the ability to use the vehicle or may allow the user to operate the vehicle in the emergency mode.

If the received destination is permissible, the autonomous driving computer may again check the user's profile to determine whether there is a predefined route to the destination. If not, the autonomous driving computer may generate a route based on any other relevant restrictions in the user's profile. The autonomous driving computer may then either display the generated route as a set of turn-by-turn directions to a user driving the vehicle manually or follow the generated route to the destination autonomously or semi-autonomously.

If a predefined route is identified, the autonomous driving computer may determine from the identified profile whether the user has permission to take alternate routes to the destination. If not, the autonomous driving computer may either display the predefined route as a set of turn-by-turn directions to a user driving the vehicle manually or follow the generated route to the destination autonomously or semi-autonomously.

If the user has permission to take an alternative route, the autonomous driving computer may calculate an alternate route. The autonomous driving computer may then calculate a deviation value (DV) based on the time, distance, and other deviation factors from the predefined route. The deviation value for the alternate route may be compared to a maximum deviation value (MDV) for alternative routes that may be associated with the identified profile. If the deviation value is greater than the maximum deviation value, the autonomous driving computer may either display the predefined route as a set of turn-by-turn directions to a user driving the vehicle manually or follow the generated route to the destination autonomously or semi-autonomously.

If the deviation value is less than or equal to the maximum deviation value, the autonomous driving computer may display the route options, including the predetermined route and the alternate route. The user may then select from one of the route options. The selected route may be received by the autonomous driving computer. The autonomous driving computer may either display the selected route as a set of turn-by-turn directions to a user driving the vehicle manually or follows the generated route to the destination autonomously (or semi-autonomously).

The vehicle may continue to follow and/or display the generated, predetermined, or selected route. If the destination is reached, the user may exit the vehicle. If the vehicle is continuing towards the destination, the autonomous driving computer may monitor whether the user is attempting to or actually leaving the route. For example, if the vehicle is being operated in a manual mode, the user may drive the vehicle off or away from the route. If the vehicle is being operated in an autonomous or semi-autonomous mode, the user may take manual control of the vehicle from the autonomous driving computer or indicate that a deviation is needed as described above. If there are no attempts to leave the route, the vehicle continues to follow and/or display the generated, predetermined, or selected route.

If the user does attempt to or actually leave the route, the autonomous driving computer may determine whether the identified profile indicates that the user has permission to deviate from the route. If not, and the vehicle is operating in an autonomous mode, the autonomous driving computer may deny the user's ability to leave the route. If the vehicle is operating in a semi-autonomous mode, the vehicle may prevent the user from leaving the route by taking full control of the vehicle, warning the user, and/or recording a log of the user's actions. If the vehicle is being operated in a manual mode, the autonomous driving computer may respond by taking control of the vehicle autonomously, warning the user, and/or recording a log of the user's actions. If the user or the autonomous computer returns the vehicle to the route, the vehicle may continue to follow and/or display the generated, predetermined, or selected route. If the user continues to attempt to or actually deviate from the route, the autonomous computer may again respond by taking control of the vehicle autonomously (if it has not already done so), warning the user, and/or recording a log of the user's actions.

If the identified profile indicates that the user does have permission to leave the route, the autonomous driving computer may begin to calculate another deviation value. This may be calculated in real time either based on a proposed route identified by the user as described above or based on the user's control of the vehicle. The new deviation value may then be compared to a maximum deviation value (MDV) which may be the same or a different maximum deviation value from the maximum deviation value used above to initially select a route. If the deviation value is greater than the maximum deviation value, the autonomous driving computer may respond based on the current mode of the operation as described above.

If the new deviation value is less than or equal to the maximum deviation value, the autonomous driving computer may allow the deviation. If the vehicle is being operated in a manual mode, the autonomous driving computer then continues to monitor whether the deviation value remains at or below the maximum deviation value. If not, the autonomous computer may respond by taking control of the vehicle autonomously, warning the user, and/or recording a log of the user's actions.

The autonomous driving computer may also monitor whether the user is attempting to deviate from the deviation. If so, the autonomous driving compute may determine a deviation value, compare to the maximum deviation value, etc. If the user does not attempt to deviate from the deviation, the vehicle may continue to follow and/or display the generated, predetermined, or selected route until reaching the destination. If the user leaves the vehicle at the destination and subsequently returns to the vehicle, the user may again provide identification information in order to use the vehicle as described above.

As shown in FIG. 1, an autonomous driving system 100 in accordance with one aspect of the disclosure includes a vehicle 101 with various components. While certain aspects of the disclosure are particularly useful in connection with specific types of vehicles, the vehicle may be any type of vehicle including, but not limited to, cars, trucks, motorcycles, busses, boats, airplanes, helicopters, lawnmowers, farm equipment, warehouse equipment, recreational vehicles, amusement park vehicles, trams, golf carts, trains, and trolleys. The vehicle may have one or more computers, such as computer 110 containing a processor 120, memory 130 and other components typically present in general purpose computers.

The memory 130 stores information accessible by processor 120, including instructions 132 and data 134 that may be executed or otherwise used by the processor 120. The memory 130 may be of any type capable of storing information accessible by the processor, including a computer-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computer code on the computer-readable medium. In that regard, the terms "instructions" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. For instance, although the system and method is not limited by any particular data structure, the data may be stored in computer registers, in a relational database as a table having a plurality of different fields and records, XML documents or flat files. The data may also be formatted in any computer-readable format. By further way of example only, image data may be stored as bitmaps comprised of grids of pixels that are stored in accordance with formats that are compressed or uncompressed, lossless (e.g., BMP) or lossy (e.g., JPEG), and bitmap or vector-based (e.g., SVG), as well as computer instructions for drawing graphics. The data may comprise any information sufficient to identify the relevant information, such as numbers, descriptive text, proprietary codes, references to data stored in other areas of the same memory or different memories (including other network locations) or information that is used by a function to calculate the relevant data.

The processor 120 may be any conventional processor, such as commercial CPUs for personal computers. Alternatively, the processor may be a dedicated device such as an ASIC. Although FIG. 1 functionally illustrates the processor, memory, and other elements of computer 110 as being within the same block, the processor and memory may actually comprise multiple processors and memories that may or may not be stored within the same physical housing. For example, memory may be a hard drive or other storage media located in a housing different from that of computer 110. Accordingly, references to a processor, computer, or memory will be understood to include references to a collection of processors or computers or memories that may or may not operate in parallel. Rather than using a single processor to perform the steps described herein some of the components such as steering components and deceleration components may each have their own processor that only performs calculations related to the component's specific function.

In various of the aspects described herein, the processor may be located remote from the vehicle and communicate with the vehicle wirelessly. In other aspects, some of the processes described herein are executed on a processor disposed within the vehicle and others by a remote processor, including taking the steps necessary to execute a single maneuver.

Computer 110 may have all of the components normally used in connection with a computer such as a CPU, memory (e.g., RAM and internal hard drives) storing data 134 and instructions such as a web browser, an electronic display 142 (e.g., a monitor having a screen, a small LCD touch-screen or any other electrical device that is operable to display information), user input 140 (e.g., a mouse, keyboard, touch screen and/or microphone), as well as various sensors (e.g. a video camera) for gathering the explicit (e.g. a gesture) or implicit (e.g. "the person is asleep") information about the states and desires of a person.

Figure 2:
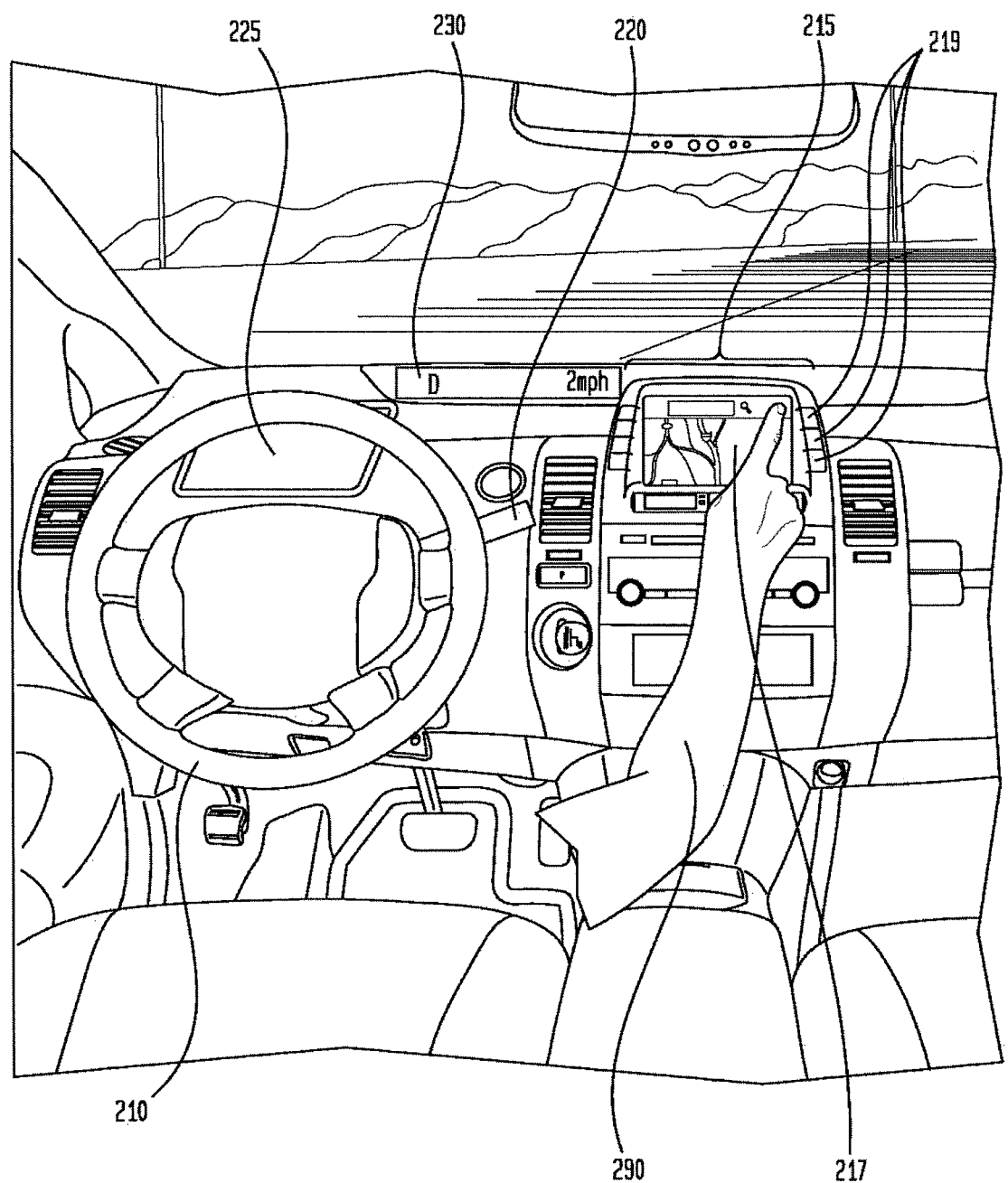
FIG. 2 is an interior of an autonomous vehicle in accordance with an embodiment.

In one example, computer 110 may be an autonomous driving computing system incorporated into vehicle 101. FIG. 2 depicts an design of the interior of an autonomous vehicle. The autonomous vehicle may include all of the features of a non-autonomous vehicle, for example: a steering apparatus, such as steering wheel 210; a navigation display apparatus, such as navigation display 215; and a gear selector apparatus, such as gear shifter 220. The vehicle may also have various user input devices, such as gear shifter 220, touch screen 217, or button inputs 219, for activating or deactivating one or more autonomous driving modes and for enabling a driver or passenger 290 to provide information, such as a navigation destination, to the autonomous driving computer 110.

Vehicle 101 may also include one or more additional displays. For example, the vehicle may include a display 225 for displaying information regarding the status of the autonomous vehicle or its computer. In another example, the vehicle may include a status indicating apparatus 138 (see FIG. 1), such as status bar 230, to indicate the current status of vehicle 101. In the example of FIG. 2, status bar 230 displays "D" and "2 mph" indicating that the vehicle is presently in drive mode and is moving at 2 miles per hour. In that regard, the vehicle may display text on an electronic display, illuminate portions of vehicle 101, such as steering wheel 210, or provide various other types of indications.

The autonomous driving computing system may be capable of communicating with various components of the vehicle. For example, returning to FIG. 1, computer 110 may be in communication with the vehicle's conventional central processor 160 and may send and receive information from the various systems of vehicle 101, for example the braking 180, acceleration 182, signaling 184, and navigation 186 systems in order to control the movement, speed, etc. of vehicle 101. In addition, when engaged, computer 110 may control some or all of these functions of vehicle 101 and thus be fully or merely partially autonomous. It will be understood that although various systems and computer 110 are shown within vehicle 101, these elements may be external to vehicle 101 or physically separated by large distances.

The vehicle may also include a geographic position component 144 in communication with computer 110 for determining the geographic location of the device. For example, the position component may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with less noise that absolute geographical location.

The vehicle may also include other features in communication with computer 110, such as an accelerometer, gyroscope or another direction/speed detection device 146 to determine the direction and speed of the vehicle or changes thereto. By way of example only, device 146 may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the user, computer 110, other computers and combinations of the foregoing.

The computer may control the direction and speed of the vehicle by controlling various components. By way of example, if the vehicle is operating in a completely autonomous mode, computer 110 may cause the vehicle to accelerate (e.g., by increasing fuel or other energy provided to the engine), decelerate (e.g., by decreasing the fuel supplied to the engine or by applying brakes) and change direction (e.g., by turning the front two wheels).

Figure 3:
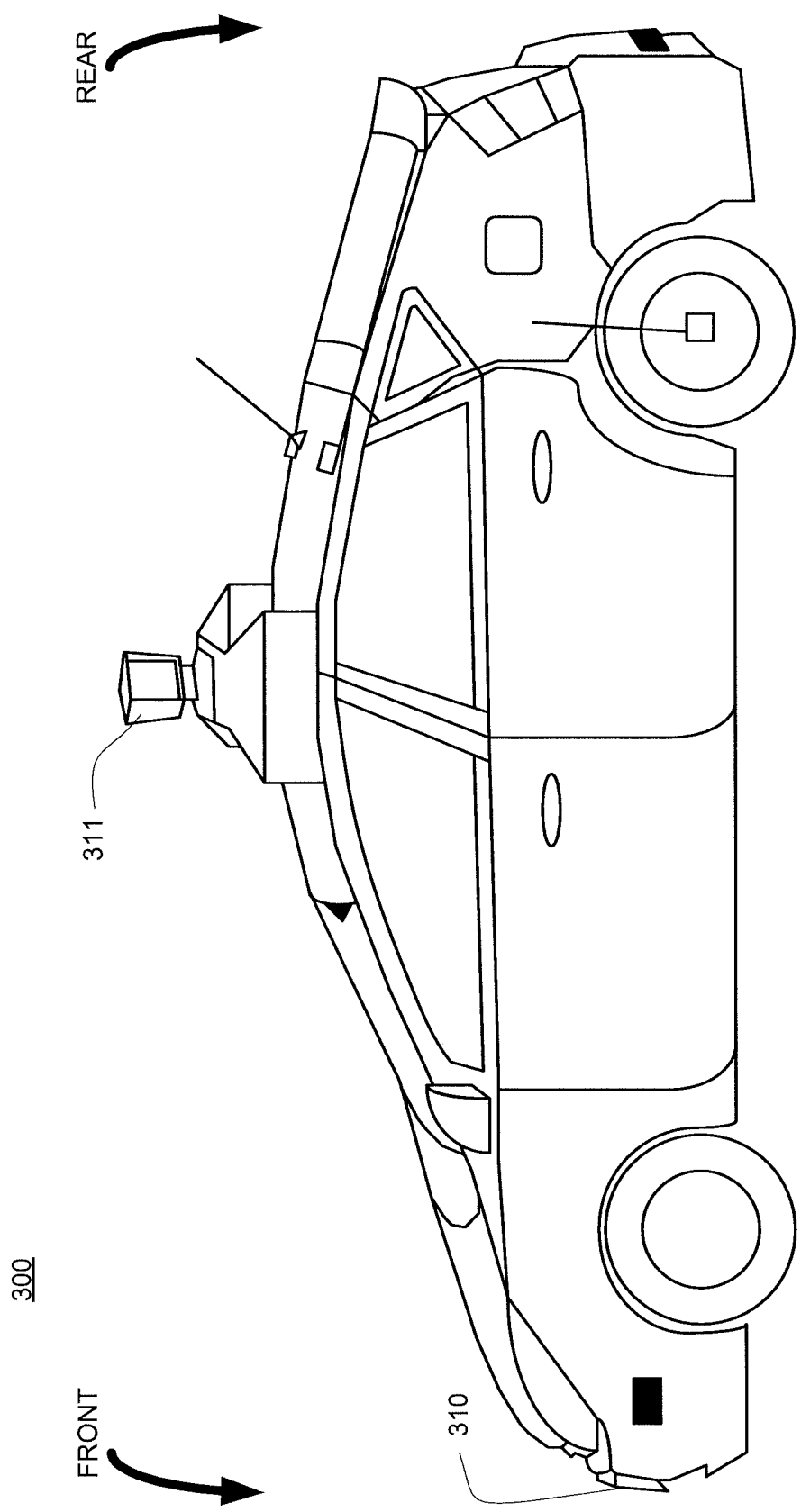
FIG. 3 is an exterior of an autonomous vehicle in accordance with an embodiment.

The vehicle may also include components for detecting objects external to the vehicle such as other vehicles, obstacles in the roadway, traffic signals, signs, trees, etc. The detection system may include lasers, sonar, radar, cameras or any other detection devices which record data which may be processed by computer 110. For example, if the vehicle is a small passenger vehicle, the car may include a laser mounted on the roof or other convenient location. As shown in FIG. 3, small passenger vehicle 300 may include lasers 310 and 311, mounted on the front and top of the vehicle, respectively. The lasers may include commercially available lasers such as the Velodyne HDL-64 or other models. In one example, laser 310 may have a range of 150 meters, a thirty degree vertical field of view, and a thirty degree horizontal field of view. Laser 311 may have a range of 50-80 meters, a thirty degree vertical field of view, and a 360 degree horizontal field of view. The laser may provide the vehicle with range and intensity information which the computer may use to identify the location and distance of various objects in the vehicles surroundings. In one aspect, the laser may measure the distance between the vehicle and the object surfaces facing the vehicle by spinning on its axis and changing its pitch.

The aforementioned sensors may allow the vehicle to understand and potentially respond to its environment in order to maximize safety for passengers as well as objects or people in the environment. It will be understood that the vehicle types, number and type of sensors, the sensor locations, the sensor fields of view, and the sensors' sensor fields are merely exemplary. Various other configurations may also be utilized.

In addition to the sensors described above, the computer may also use input from sensors typical of non-autonomous vehicles. For example, these sensors may include tire pressure sensors, engine temperature sensors, brake heat sensors, brake pad status sensors, tire tread sensors, fuel sensors, oil level and quality sensors, air quality sensors (for detecting temperature, humidity, or particulates in the air), etc.

Many of these sensors provide data that is processed by the computer in real-time, that is, the sensors may continuously update their output to reflect the environment being sensed at or over a range of time, and continuously or as-demanded provide that updated output to the computer so that the computer can determine whether the vehicle's then-current direction or speed should be modified in response to the sensed environment.

In addition to processing data provided by the various sensors, the computer may rely on environmental data that was obtained at a previous point in time and is expected to persist regardless of the vehicle's presence in the environment. For example, returning to FIG. 1, data 134 may include detailed map information 136, e.g., highly detailed maps identifying the shape and elevation of roadways, lane lines, intersections, crosswalks, speed limits, traffic signals, buildings, signs, real time traffic information, or other such objects and information. For example, the map information may include explicit speed limit information associated with various roadway segments. The speed limit data may be entered manually or scanned from previously taken images of a speed limit sign using, for example, optical-character recognition. The map information may include three-dimensional terrain maps incorporating one or more of objects listed above. For example, the vehicle may determine that another car is expected to turn based on real-time data (e.g., using its sensors to determine the current GPS position of another car) and other data (e.g., comparing the GPS position with previously-stored lane-specific map data to determine whether the other car is within a turn lane).

Again, although the map information is depicted herein as an image-based map, the map information need not be entirely image based (for example, raster). For example, the map information may include one or more roadgraphs or graph networks of information such as roads, lanes, intersections, and the connections between these features. Each feature may be stored as graph data and may be associated with information such as a geographic location and whether or not it is linked to other related features, for example, a stop sign may be linked to a road and an intersection, etc. In some examples, the associated data may include grid-based indices of a roadgraph to allow for efficient lookup of certain roadgraph features.

Data 134 may also include permission data 150. For example, permission data may include destinations, routes, and other control rights predefined or set by a user. The permission data may comprise a plurality of profiles, each profile associated with a particular user of the vehicle. For example, the permission data may include information identifying maximum speed limits for a user that may or may not correspond to the legal driving limit, such as where a parent wants to limit a maximum speed on a highway to 60 mph when the speed limit is actually 65 mph. In another example, the permission data or profile for a particular user may include one or more permissible destinations. The destinations may be as specific as latitude and longitude coordinates or an address, or may be a much broader area such as a neighborhood or a town. These permissible destinations may also be associated with predefined routes. A predefined route may include information as general as a listing of the roads on which the vehicle must go or as specific as which lanes must be used.

The permission data may also identify restricted destinations to or through which the user is not permitted to travel, times during which the user is not permitted to travel, or locations at which the user is not permitted to stop. For example, a parent may want the vehicle to stay away from highways, high traffic areas, or school zones (where children are likely to be present). Similarly, a parent may want to prevent the vehicle from transporting a child during certain time periods such as typical commuting hours, during dusk or evening hours, on weekends, for a specific period of time (for example if a child is being punished), etc. For example, one user may only have permission to use the vehicle on weekday mornings between 7:00 am and 7:30 am to travel to school or work. Between 12:00 pm and 1:00 pm the user may only have permission to use the vehicle to travel to home, pre-specified restaurants, or back to work. Between 3:00 pm and 6:00 pm, the user may only have permission to use the vehicle to go home. Similarly, the user's profile may have restrictions on non-school or work days, weekends, holidays, summer months, etc. In another example, a user's profile may define only those locations to which the user is not allowed to travel, such that all other destinations would be permissible. In yet another example, the user's profile may define a permissible area, such as a town, with restricted areas, such as particular neighborhood, to which the user does not have permission to travel. Accordingly, any number of restrictions and combinations may be used to generate a user's profile.

The permission data may also include information defining one or more maximum deviation values, for example in terms of time and/or distance that the user may travel away from a predefined route. For example, the maximum deviation values may include a maximum combined difference from a predetermined route measured by combining a number of factors such as distance (taking a side road 300 meters or 2 miles to get around an accident), expected duration or travel time (an addition 10 minutes or 2 minutes faster), and proximity to any restricted areas as described above. The one or more maximum deviation values may be used by the computer in different situations. For example, one maximum deviation value may be used when determining an alternate route before a vehicle has begun following a predefined route. Another maximum deviation value may be used when the vehicle is already following a predefined route.

In another example, permission data may be encoded directly onto a user's access device to a vehicle. For example a user may have an access device such as a key, a card with an RFID, mobile phone, or other mobile device which includes the user's profile data.

In addition to the operations described above and illustrated in the figures, various operations will now be described. It should be understood that the following operations do not have to be performed in the precise order described below. Rather, various steps can be handled in a different order or simultaneously, and steps may also be added or omitted.

The vehicle receives permission data from a first user. For example, a parent, guardian, law enforcement representative, owner of the vehicle, manufacturer or other authorized administrator may input data identifying a child as well as a set of destinations, routes, and/or control rights. This information may be input in the vehicle, or remotely at another computer and subsequently transmitted to the vehicle's autonomous driving computer.

Figure 4:
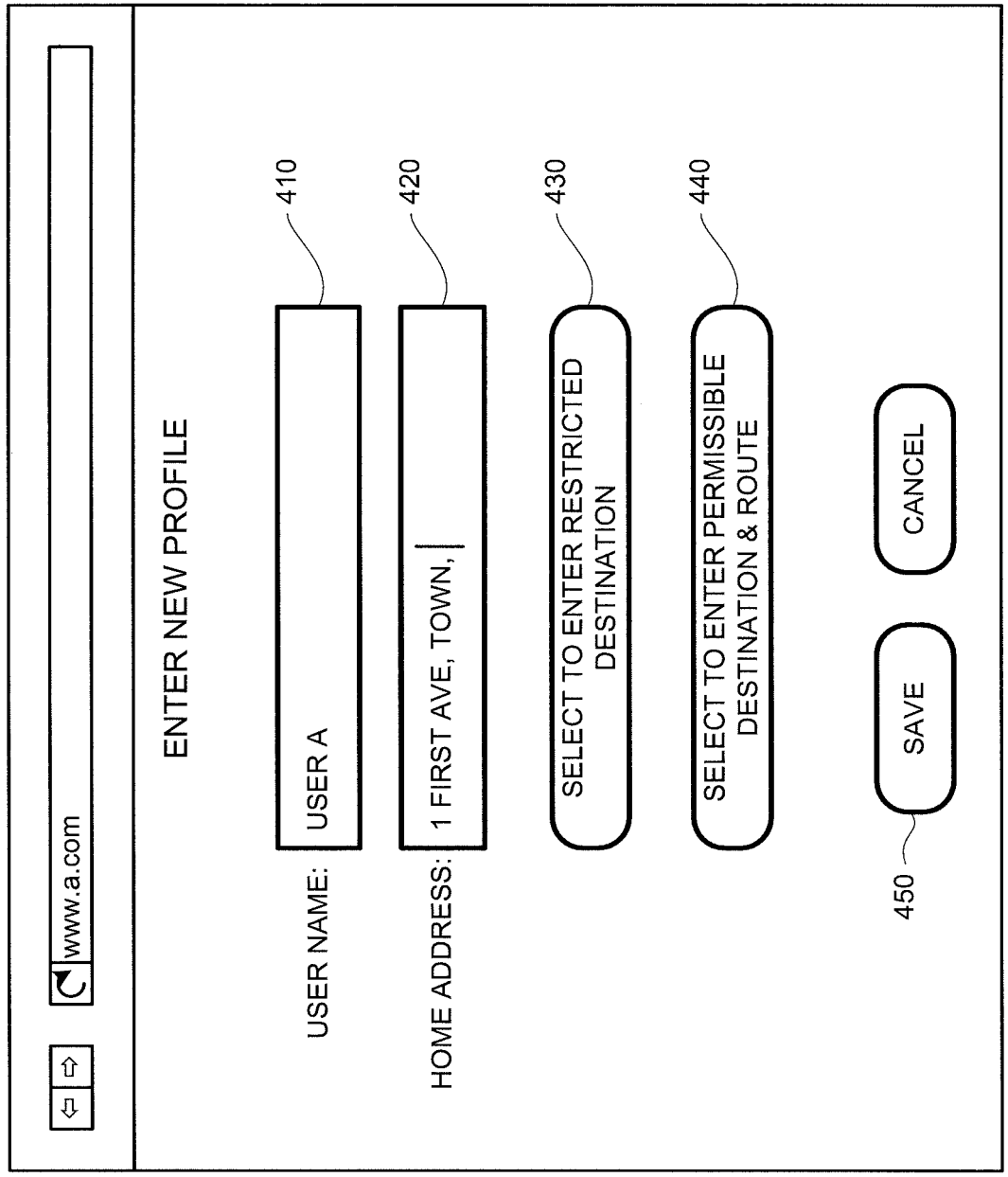
FIG. 4 is a screen shot in accordance with an embodiment.
Figure 5:
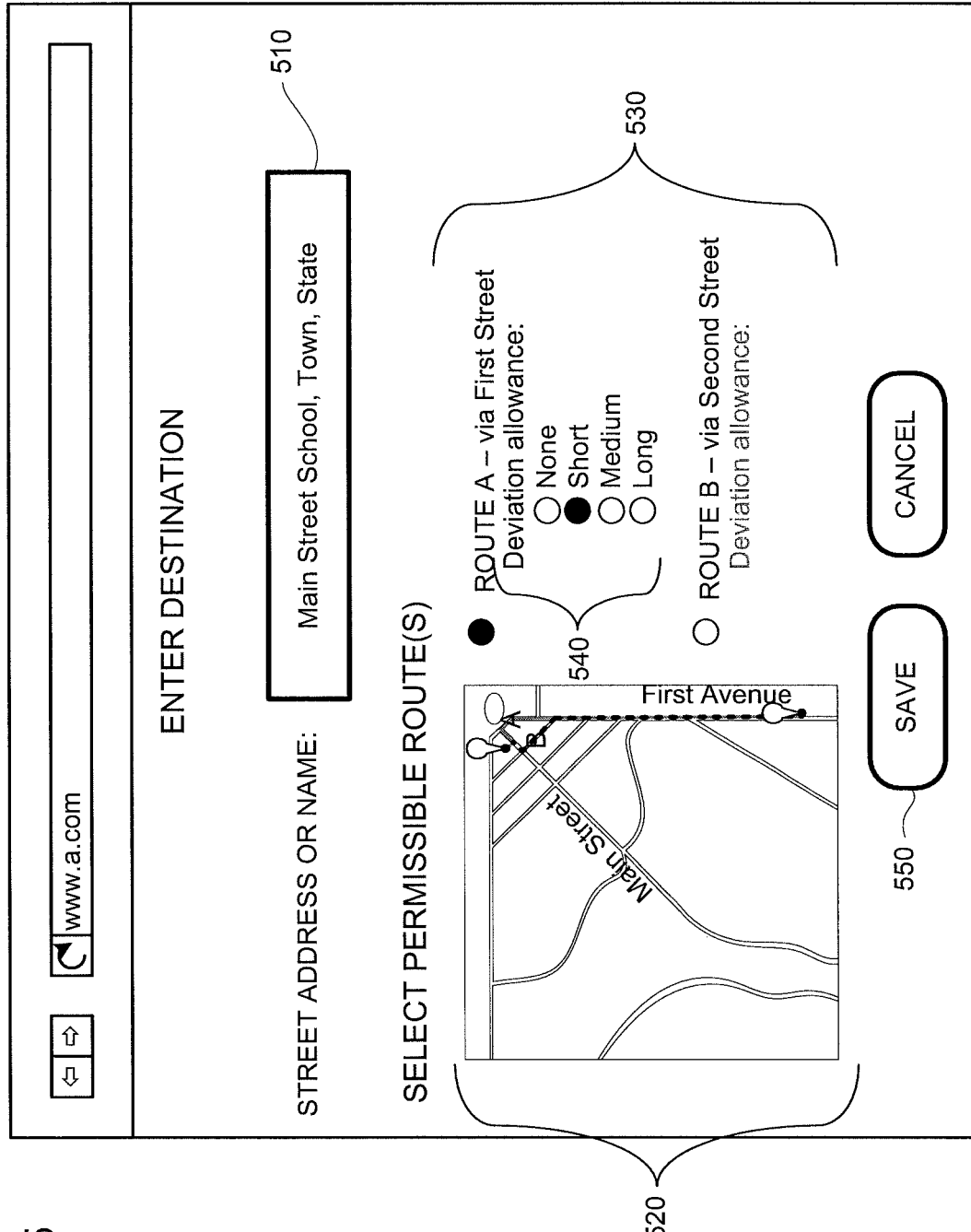
FIG. 5 is another screen shot in accordance with an embodiment.

As shown in screen shot 400 of FIG. 4, the first user may input information into boxes identifying a user name 410, here "User A," and a primary location, here home address 420. The first user may also select buttons 430 and 440 to enter restricted destinations as well as permissible destinations. In the example of screen shot 500 of FIG. 5, once the first user has selected to input a destination and routes, a new screen which allows the first user to enter destination information may be displayed. In this example, the name of a school, "Main Street School" as well as the approximate location "Town, State" have been entered into a street address or name box 510. In response, a map 520 is displayed with a list of possible routes 530. The first user may then select a possible route, for example, by clicking on a mouse or touch screen to indicate a selection of "Route A." The first user may then also indicate a permissible deviation allowance 540 or maximum deviation value from the selected route. In this example, the first user may select between no deviations (none), a short deviation (short), a medium deviation (medium) or a long deviation (long). It will be understood that various other ways of selecting deviation values may also be used. Once the first user is satisfied, he or she may select a button 550 (and/or button 450 of FIG. 4) to save the settings. Other permission information, such as speed, date, time, and stopping restrictions may also be inputted.

Figure 6:
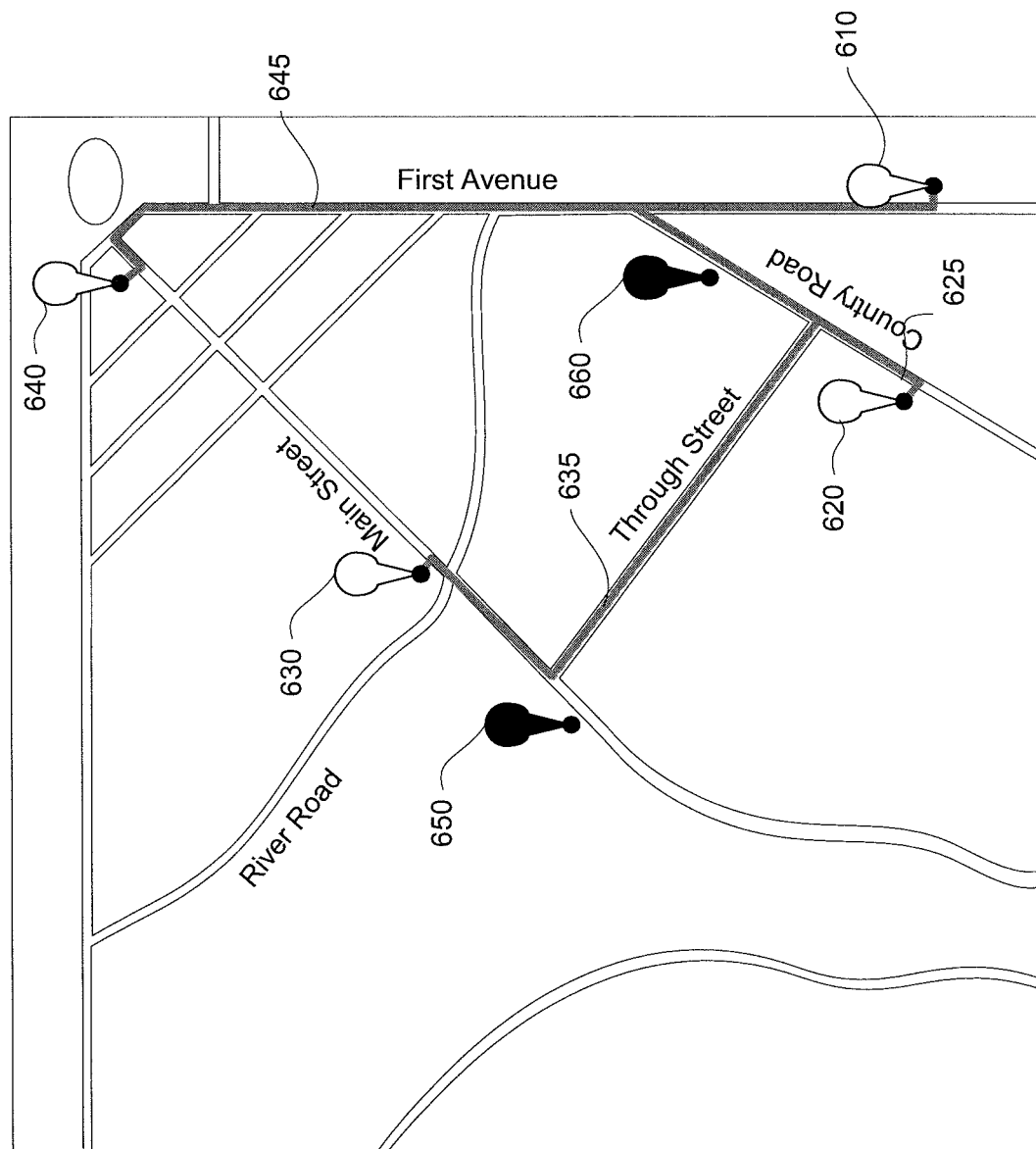
FIG. 6 is a map and data in accordance with an embodiment.

The input may be used to generate a profile for the child. For example, map 600 of FIG. 6 depicts a pictorial representation of some aspects of the profile of "User A" of FIG. 4. For example, User A's profile may include a primary location 610 corresponding to User A's home. The profile may also include a number of different destinations at which User A may be permitted to go, including locations 620, 630, and 640. Lines 625, 635, and 645 may represent permissible routes to these respective destinations. Map 600 also includes locations 650 and 660 at which User A is not permitted to stop.

In another example, there may be predefined profiles to assist new users in programming the vehicle's computer. For example, a predefined profile may include restrictions consistent with Cinderella licensing laws which restrict use of any vehicles of new drivers during evening, night time, and early morning hours. This may assist the first user in setting up a new profile.

The new profile may be stored with the permission data as described above. A stored profile may be modified by the first user at a later time, for example, to lift restrictions or add new ones, change the home address, etc.

A driver, or user, may identify his or herself to the vehicle before entering or using the vehicle. For example, the User A may be required to provide a driver's license, give biometric information such as a thumb print or eye scan, enter a user name and password, have a key with a radio transmitter, scan an RFID badge, or display other item of identification to automatically provide his or her user information before entering the vehicle. Alternatively, the user may first enter the vehicle and subsequently identify him or herself.

Once the user has been identified, the vehicle may access the permission data and identify the profile associated with the user. For example, User A may identify him or herself to the vehicle. In response, the autonomous driving computer may access the stored profile data and identify a profile associated with User A's identification information. In another example, the autonomous driving computer may access profile data from the user's access device, such as a key, card with an RFID, mobile phone, or other mobile device. In this example, the vehicle may not be required to specifically identify the user, but may simply identify the user's profile from the access device.

The vehicle may use the profile data in various ways depending upon the type of the permission data and the features of the vehicle. In one example, once the user has identified him or herself, the vehicle may first determine whether the user has permission to use the vehicle at the present time. If not, the vehicle may notify the user that the user does not have permission at the current time.

In some examples, the vehicle may also include a emergency override mode which allows the user to enter the vehicle and transport the user to a particular location, such as "home," "police station," "hospital," etc., at any time. In this example, the first user and emergency services (police, fire, and/or medical services) may be notified via a secured network link with the vehicle.

Figure 7:
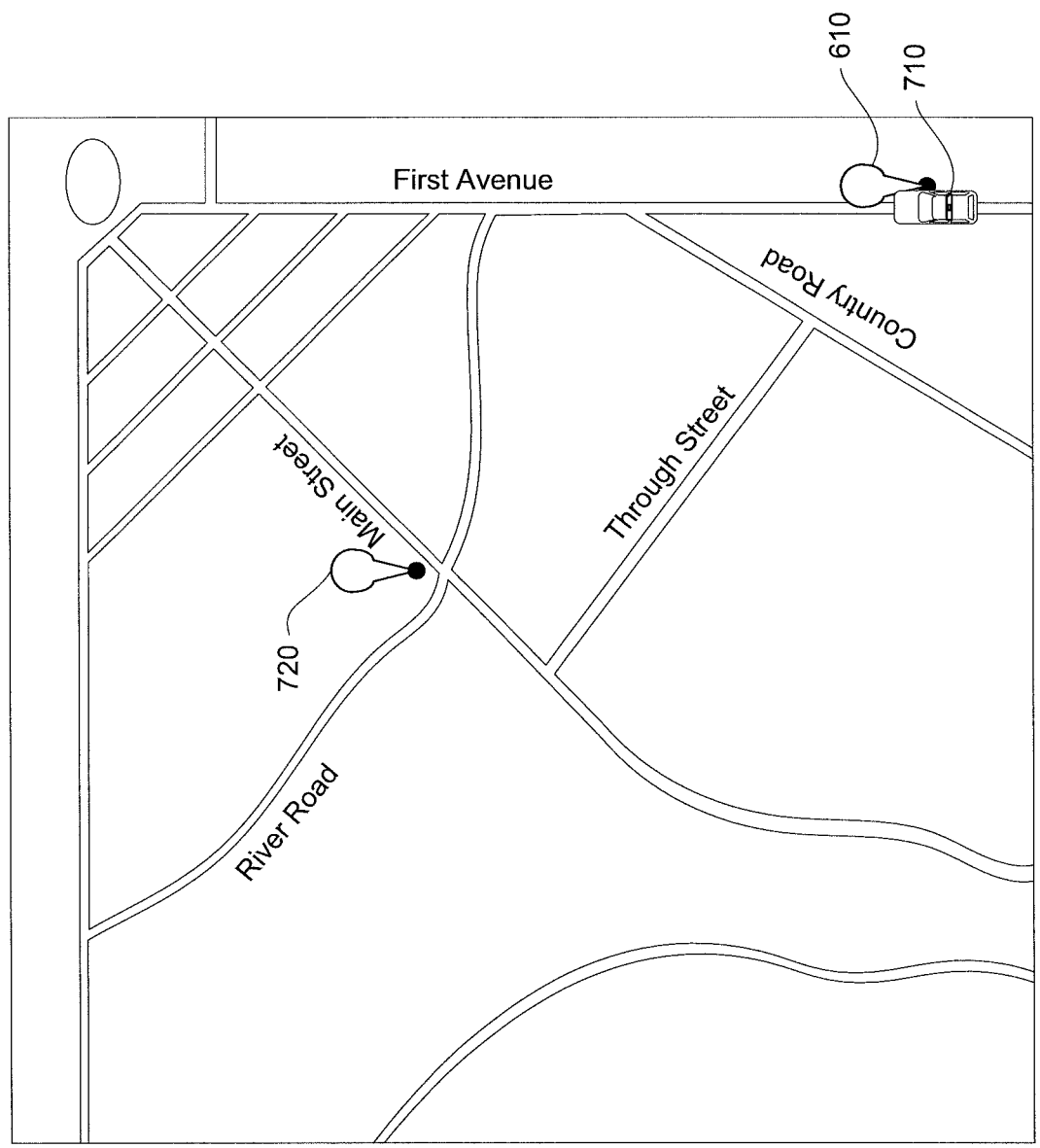
FIG. 7 is another map and data in accordance with an embodiment.

Similarly, if the user does have permission to use the vehicle at the present time, the vehicle may allow the user to enter a destination. For example, the user may speak a destination or enter one into the vehicle's navigation system 186 using a touch screen (such as touch screen 217 of FIG. 2), buttons (such as input buttons 219 of FIG. 2), or another input device. In response to receiving the destination, the vehicle may determine whether the user's profile identifies the destination as a permissible destination. If not, the vehicle may provide a notification to the user that the user does not have permission to travel to the destination or that the destination is unavailable. For example, User A and the vehicle are currently located at location 710. User A may provide the destination "Main Street School," shown as location 720 in map 700 of FIG. 7. In response, the autonomous driving computer may determine whether the destination is identified as a permissible destination (one that User A may travel to) in User A's profile.

If the user's profile does indicate that the user has permission to travel to the destination, the vehicle may transport the user to the destination autonomously without further input from the user. Alternatively, the vehicle may allow the user to operate the vehicle in a manual mode and display a set of turn by turn directions, for example on navigation display 215, for the user to follow to the destination. The vehicle may also be used in a semi-autonomous mode where the user controls one or more aspects of the vehicle, such as steering, acceleration, braking, etc., to maneuver the vehicle to the destination.

Figure 8:
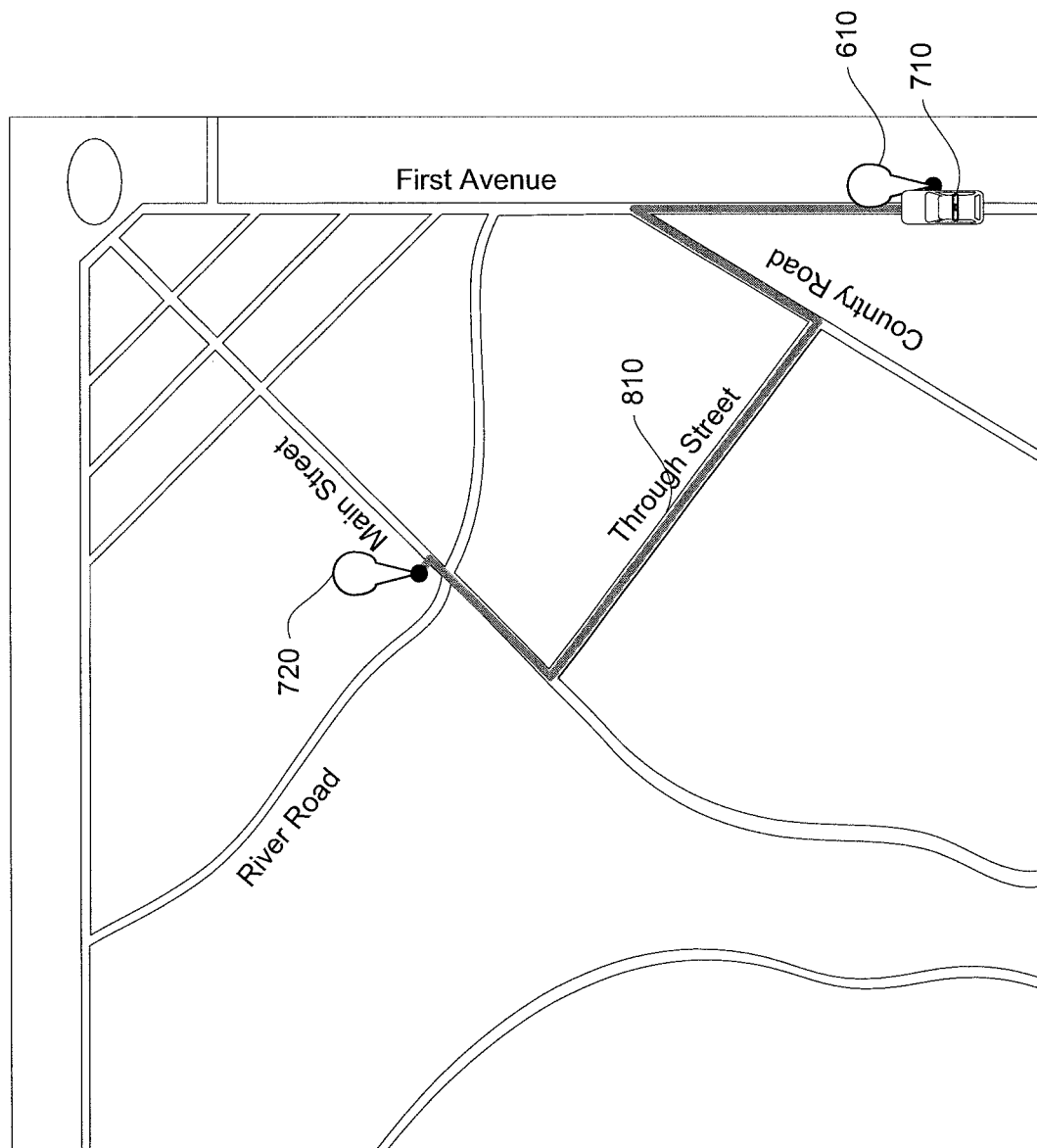
FIG. 8 is a further map and data in accordance with an embodiment.

In some examples, the permission data may also define a particular route to the destination. For example, as shown in map 800 of FIG. 8, User A's profile includes route 810 from user's A's home to location 720. If so, the vehicle may transport the user to the destination using this predefined route or allow the user to control one or more aspects of the vehicle to maneuver the vehicle along the predefined route.

Figure 11:
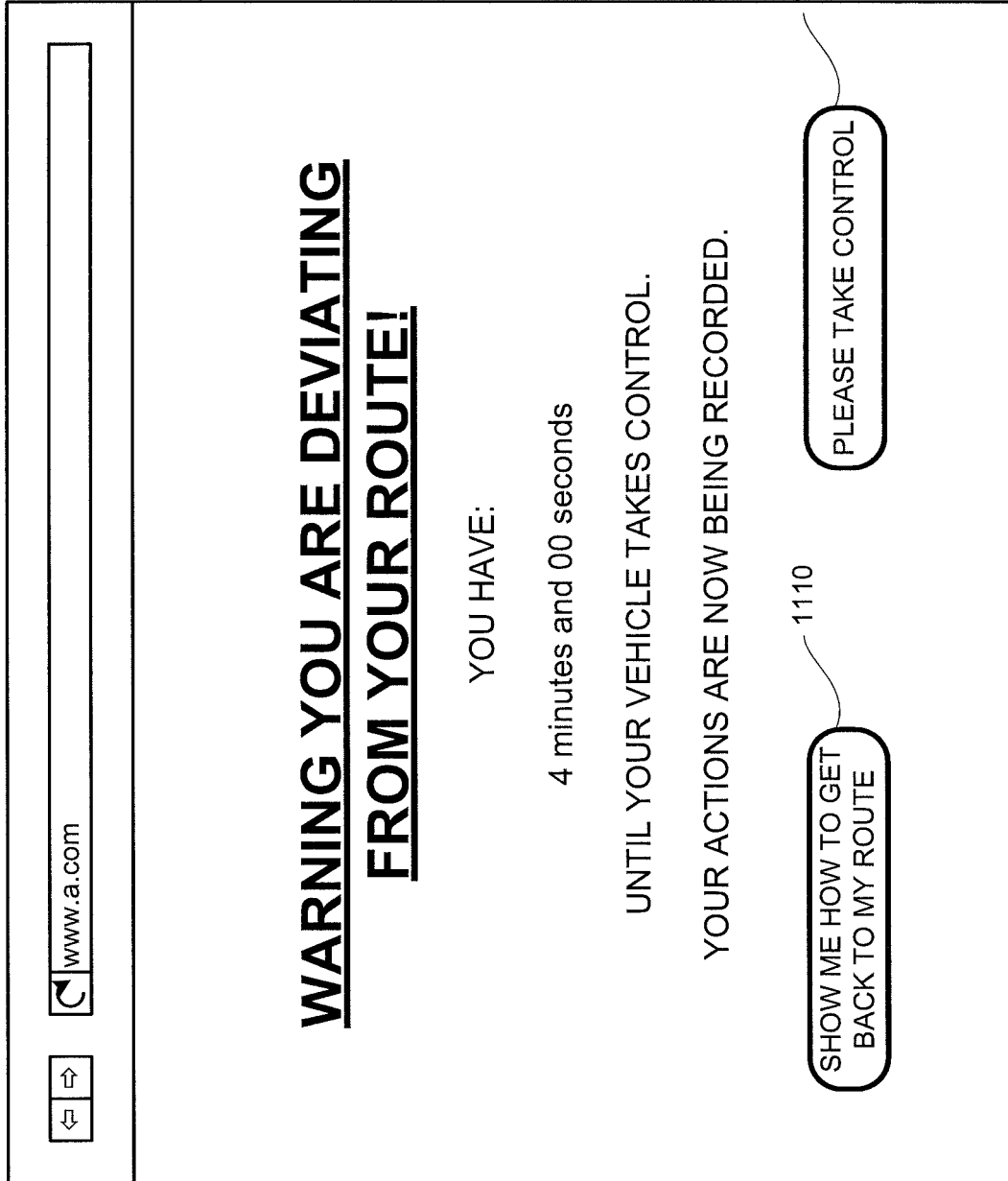
FIG. 11 is yet another screen shot in accordance with an embodiment.

If the user attempts to maneuver the vehicle away from the predefined route or stop at a location which is restricted by the user's profile, the vehicle may respond by warning the user one or more times that the user is about to or has left the predefined route. For example, the vehicle may display warning information (see FIG. 11), flash lights, or use audible cues to warn the driver.

In one example, in response to determining that the user has left the predefined route or stopped at a restricted location, the vehicle may begin to record the user's actions, the vehicle's location and speed, as well as other data and generate a log. This log may then be accessed and reviewed by or transmitted to the first user, who may be a parent, guardian, or another third party who may have previously set the user's profile. For example, the first user may review the log by identifying his or herself to the vehicle and subsequently viewing the log on a display of the vehicle or downloading the log to another device. The log may also be transmitted wirelessly, for example, via a network such as a cellular network, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computers, such as modems and wireless interfaces. Alternatively, the vehicle may eventually take control in a fully autonomous mode to prevent the user from maneuvering the vehicle away from the predefined route.

After receiving a destination, and before following or displaying a predefined route, the vehicle may also provide the user with a list of one or more alternative routes. For example, if the user's profile includes a predefined route to the destination, the autonomous driving computer may determine whether the user's profile indicates that the user may deviate from the predefined route. If so, a plurality of alternative routes may be calculated based on traffic conditions, duration, and distance. For example, User A's profile may indicate that user A has permission to deviate from route 810. Accordingly, as shown in map 900 of FIG. 9, the autonomous driving computer has calculated two alternative routes, 910 and 920.

The alternative routes may then be compared to the predetermined route to calculate factors such as distance from the predefined route, expected duration or travel time, and proximity to any restricted areas as described above. These factors may be weighted and summed into a deviation value for each alternative route. The deviation values may then be compared to the maximum deviation threshold. Any alternative routes associated with a deviation value greater than the maximum deviation threshold may be excluded.

In one example, a route R may include a travel time of T to the destination. An alternative route R1 may involve driving a maximum distance D1 from route R, and the travel time for route R1 may be T1. Similarly, another alternative route R2 may involve driving a maximum distance D2 from route R, and the travel time for route R2 may be T2. In this example, D1>D2, and T>T1>T2. By changing the respective weights of distance and time to the maximum deviation value, in some examples R1 may be more likely to be excluded if distance is weighed heavily, whereas R2 may be more likely to be excluded if time is weighed heavily.

In another example, the predefined or ideal route (i) may be compared to an alternate route (a) using the equation:

$$\left(\frac{\text{length}(a) - \text{length}(i)}{\text{length}(i)} \times \text{weight\_length}\right) +$$
$$(\text{max\_distance} \times \text{weight\_distance}) + \left(\frac{\text{time}(a) - \text{time}(i)}{\text{time}(i)}\right) < \text{Limit}$$

In this example, the max_distance may be the maximum distance between a travel point on the alternate route and the closest point on the ideal route. This max_distance may be a maximum deviation value preset and stored at the computer or identified by the first user (setting up the profile). Each of the values identified above, length, distance, and time are each associated with a particular weight value. These weighted values may be summed and compared to some limit value. The limit value may also be a maximum deviation value preset and stored at the computer or identified by the first user (setting up the profile). This is a simplified example used herein to describe a comparison generally. Accordingly, these comparative equations may become more complicated as the autonomous driving computer is required to take more information into consideration.

Figure 9:
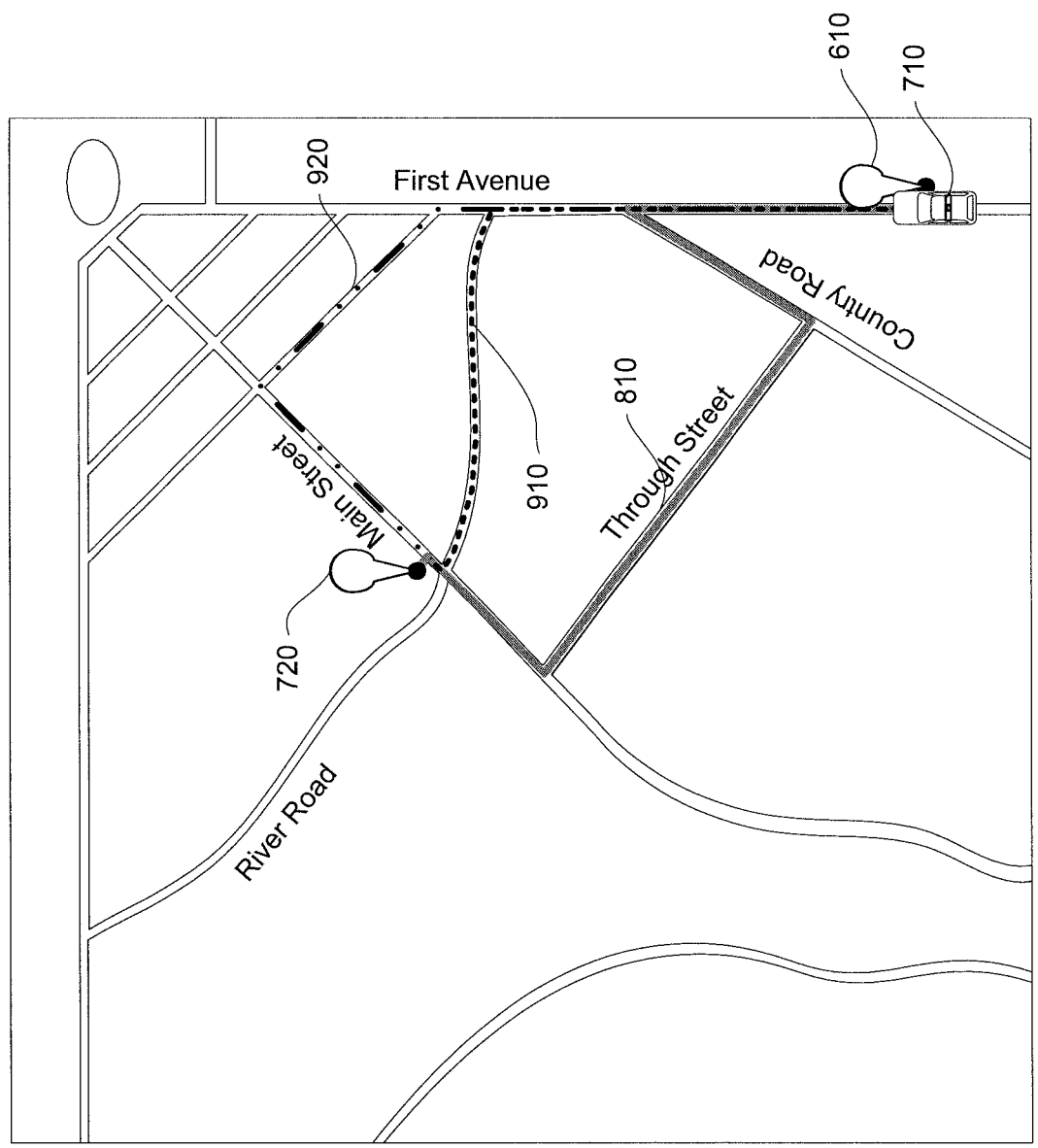
FIG. 9 is yet another map and data in accordance with an embodiment.

In the example of FIG. 9, route 910 may be associated with a deviation value at or below the maximum deviation value, while route 920 may be associated with a deviation value above the maximum deviation value.

Figure 10:
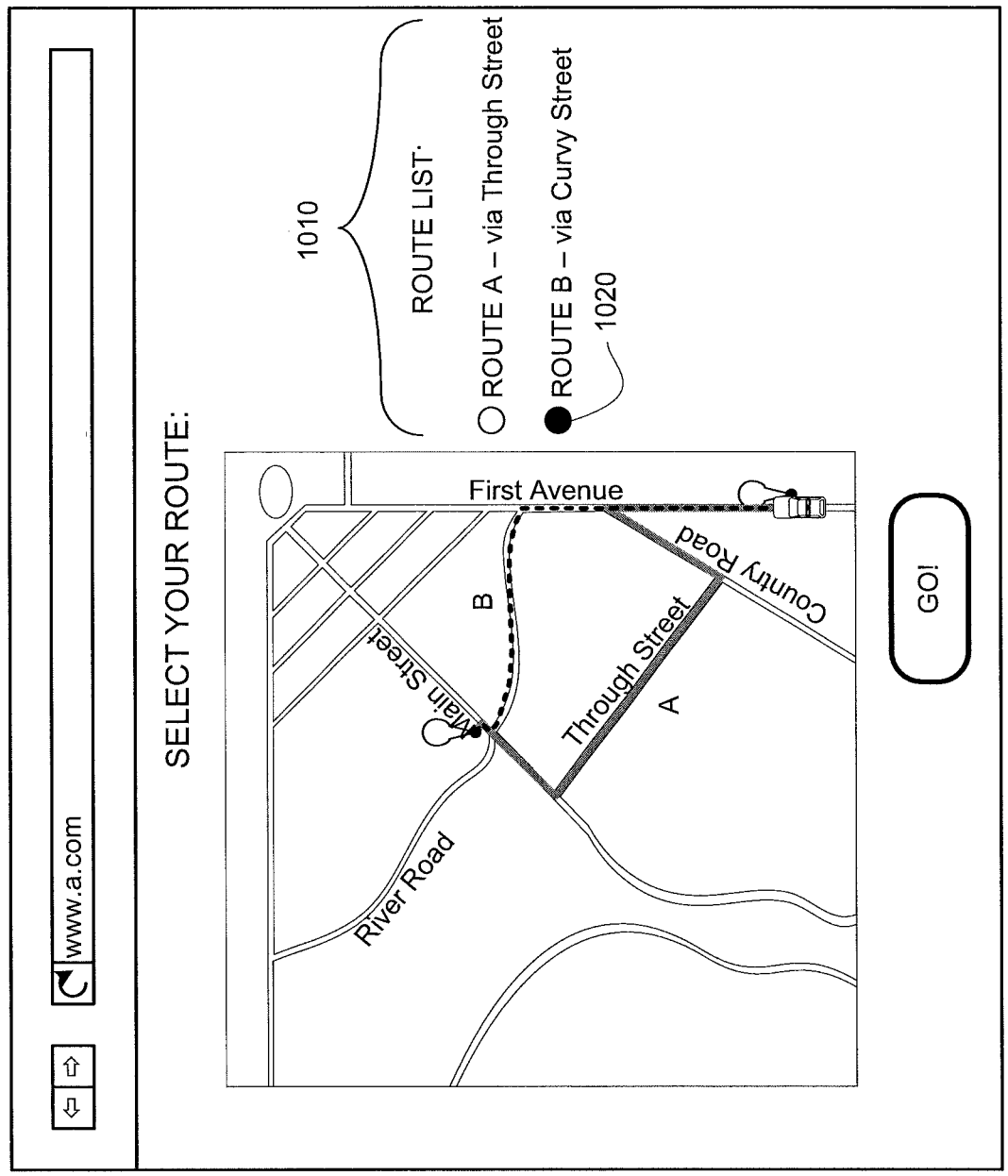
FIG. 10 is a further screen shot in accordance with an embodiment.

One or more alternative routes with deviation values at or below the maximum deviation threshold may be presented to the user on a display. The user may then select between the predetermined route and any of the presented alternative values. For example, as shown in screen shot 1000 of FIG. 10, User A is provided with a route list 1010 including two options for traveling to "Main Street School:" Route A by way of Through Street (corresponding to route 810, the predefined route) and Route B by way of Curvy Street (corresponding to route 910, an alternate route). In this example, as indicated by the darkened circle 1020, User A has selected to follow Route B. In response, the vehicle may display a list of turn by turn directions for User A to follow in a manual mode or the vehicle may follow Route B autonomously (or semi-autonomously).

In some instances, it may become necessary to deviate from a route while the vehicle is following it, such as if there is an accident, traffic, construction, etc. Accordingly, before assuming control or notifying the user, the vehicle may access the user's profile to determine whether the user has permission to change the route of the vehicle completely or by a maximum deviation value. For example, the user may want command the vehicle to take a side street in order to avoid a congested intersection. The user may control the vehicle manually off of the route and towards the side road.

If the user controls the vehicle manually, the vehicle may respond by warning the user one or more times that the user is or has left the predefined route and also indicate whether the vehicle is approaching the maximum deviation value. If the maximum deviation value is met, the vehicle may do one or more of the following: maneuver itself autonomously or semi-autonomously, record a log of the user's actions and the vehicle's movements as in the example above, notify the first user who programmed the user's profile, or notify legal authorities. For example, as shown in screen shot 1100 of FIG. 11, the vehicle may display a notification that the user may operate the vehicle for 4 minutes before reaching the maximum deviation value. In this example, the User A has taken manual control and is deviating from the route. The warning is a counter indicating when the vehicle has reached the maximum deviation value, when the vehicle will take autonomous control. The autonomous driving computer may also provide User A with options such as a button 1110 to show the User a map or provide turn by turn directions to get back to the route and/or a button 1112 to allow the autonomous driving computer to take control of the vehicle immediately.

In another example, if the user would like to deviate from the route, but not take manual control of the vehicle, the user may identify the deviation by drawing or otherwise indicating the change on the navigation display. The vehicle may then calculate a deviation value for the deviation identified by the user. The deviation value may be compared to a maximum deviation value associated with the user's profile to determine whether the identified deviation is permissible. If so, the vehicle may follow the identified deviation autonomously. If the identified deviation is not permissible, the vehicle may notify the user and continue along the predefined route.

In some examples, the user may need or want to deviate from the deviation. In this example, the same or another maximum deviation value may be compared to the route identified or taken by the user as described above. In this regard, the vehicle may prevent users from attempting to trick the vehicle by deviating from a deviation.

If the user's profile does not include a predefined route, the vehicle's navigation system may identify a route between the vehicle's current location and the destination. For example, the route may be based on a shortest distance or avoiding specific areas (high-traffic or school zones) or roads (parkways, turnpikes, or expressway) as defined in the user's profile and permission data. In this regard, even without the predefined routes, the vehicle may operate within the constraints of predefined parental parameters. The vehicle may then transport the user to the destination along the identified route. Alternatively, the user may begin to maneuver the vehicle towards the destination. In this example, the vehicle may continuously monitor whether the vehicle is approaching any areas through which the user is not permitted to travel.

Once the vehicle has arrived at the destination, the vehicle may drop the particular occupant off at the destination. In some examples, the vehicle may wait until the passenger is ready to move to another destination. Again, upon return to the vehicle, the user may be required to identify him or herself to the vehicle so that the vehicle may identify the user's profile and any associated constraints.

Figure 12A:
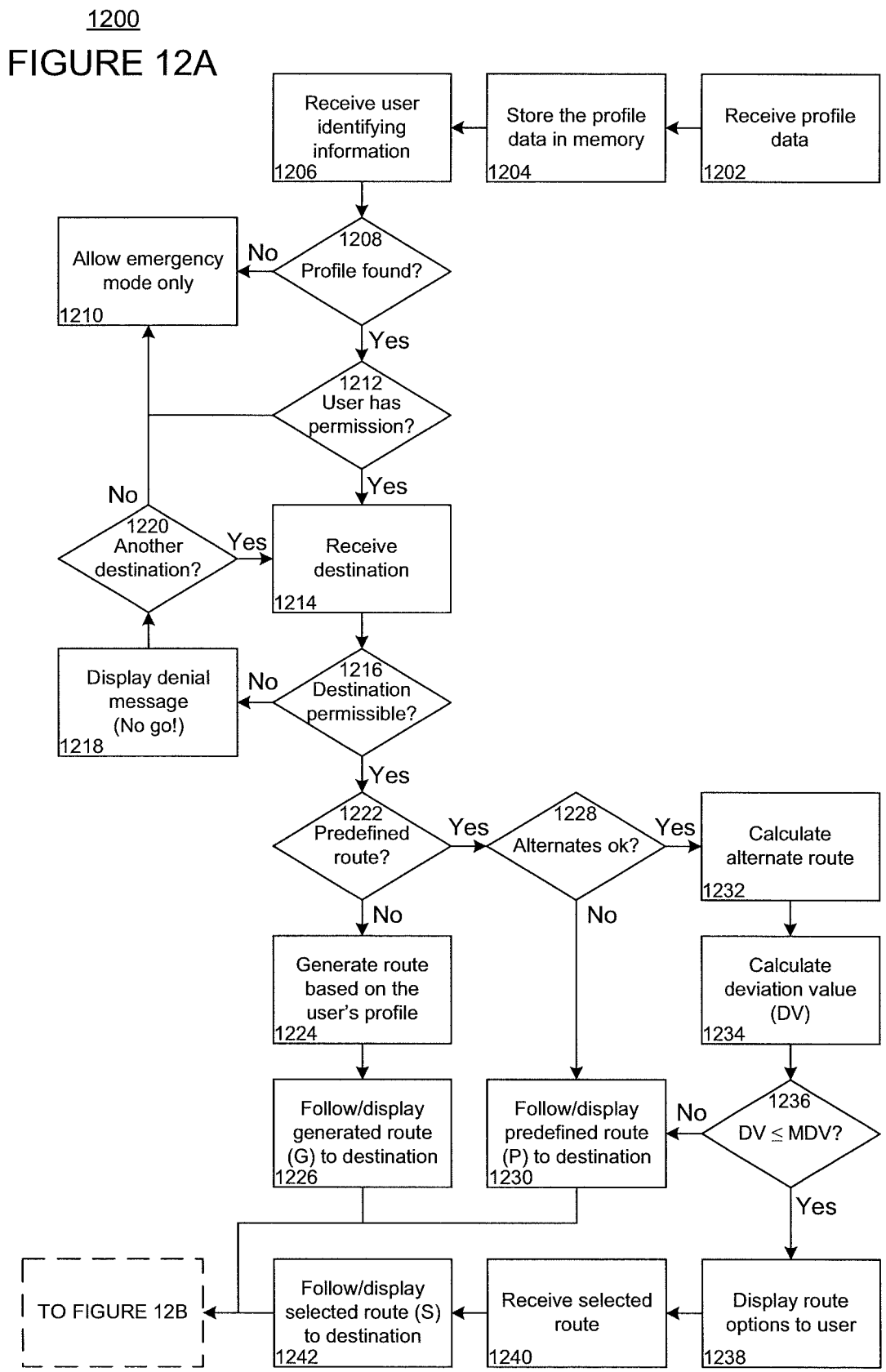
FIGS. 12A and 12B are a flow diagram in accordance with an embodiment.
Figure 12B:
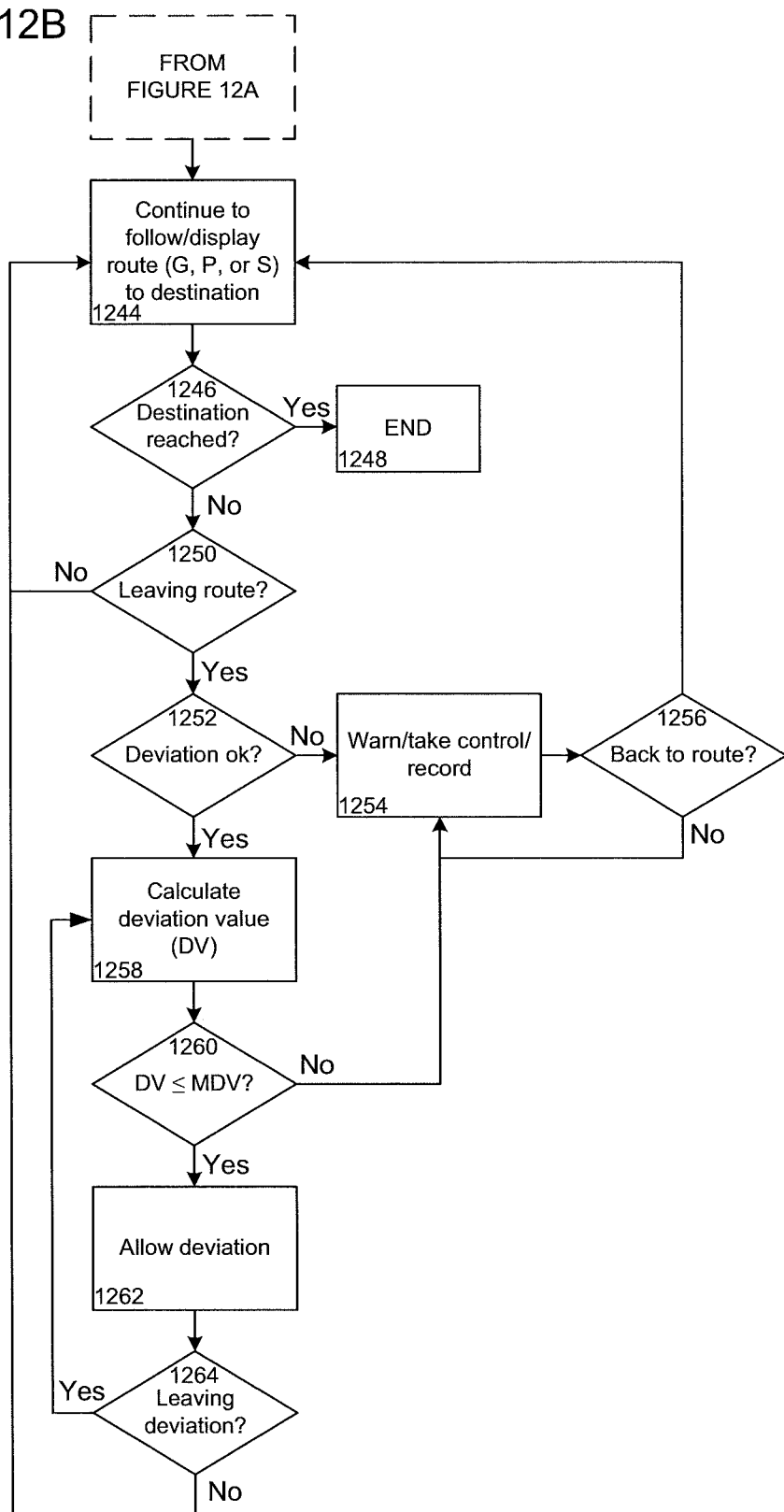

Flow diagram 1200 of FIGS. 12A and 12B provides a depiction of some of the features described above. For example, as shown in block 1202, the vehicle's autonomous driving computer receives profile data for a user. As described above, this information may be provided by an authorized administrator such as parent, guardian, law enforcement representative, etc. The profile data is stored in memory accessible by the autonomous driving computer at block 1204. Later, at block 1206, the vehicle receives information identifying a user. For example, the user may present an identification card, biometric information, or other identifier.

In response to receiving the identifying information, the autonomous driving computer accesses the memory to determine whether the identifying information is associated with a particular user profile at block 1208. If not, the autonomous driving computer may deny the user the ability to use the vehicle or may allow the user to operate the vehicle in an emergency mode as described above and shown in block 1210.

If a user profile is identified, the autonomous driving computer determines whether the user currently has permission to use the vehicle at block 1212. For example, the autonomous driving computer may determine whether there are any date and/or time restrictions and if so, whether they indicate that the user currently has permission to use the vehicle. If not, the process returns to block 1210 where the autonomous driving computer may deny the user the ability to use the vehicle or may allow the user to operate the vehicle in the emergency mode.

If the user does have permission to use the vehicle, or if there are no particular date and/or time restrictions, the user may provide a destination. This destination is received by the autonomous driving computer at block 1214. The autonomous driving computer then determines, based on the identified profile, whether the destination is a permissible destination at block 1216. If not, the vehicle may present a denial or warning message such as "You do not have permission to go to this destination," as shown in block 1218. The vehicle may allow the user to submit another destination at block 1220. If the user does not submit a new destination, the process again returns to block 1210 where the autonomous driving computer may deny the user the ability to use the vehicle or may allow the user to operate the vehicle in the emergency mode.

Returning to block 1216, if the received destination is permissible, the autonomous driving computer again checks the user's profile to determine whether there is a predefined route to the destination at block 1222. If not, the autonomous driving computer generates a route based on any other relevant restrictions in the user's profile at block 1224. The autonomous driving computer then either displays the generated route as a set of turn-by-turn directions to a user driving the vehicle manually or follows the generated route to the destination autonomously (or semi-autonomously) at block 1226.

Returning to block 1222, if a predefined route is identified, the autonomous driving computer determines from the identified profile whether the user has permission to take alternate routes to the destination at block 1228. If not, the autonomous driving computer either displays the predefined route as a set of turn-by-turn directions to a user driving the vehicle manually or follows the generated route to the destination autonomously (or semi-autonomously) at block 1230.

If the user has permission to take an alternative route, the autonomous driving computer calculates an alternate route at block 1232. The autonomous driving computer then calculates a deviation value based on the time, distance, and other deviation factors from the predefined route at block 1234. The deviation value for the alternate route is then compared to a maximum deviation value that may be associated with the identified profile, at block 1236. If the deviation value is greater than the maximum deviation value, the autonomous driving computer either displays the predefined route as a set of turn-by-turn directions to a user driving the vehicle manually or follows the generated route to the destination autonomously (or semi-autonomously) at block 1230.

If the deviation value is less than or equal to the maximum deviation value, the autonomous driving computer displays the route options, including the predetermined route and the alternate route at block 1238. The user may then select from one of the route options. The selected route is received by the autonomous driving computer at block 1240. The autonomous driving computer either displays the selected route as a set of turn-by-turn directions to a user driving the vehicle manually or follows the generated route to the destination autonomously (or semi-autonomously) at block 1242.

Turning to block 1244 of FIG. 12B, the vehicle continues to follow and/or display the generated, predetermined, or selected route from blocks 1226, 1230, or 1242 of FIG. 12A. At block 1246, if the destination is reached, the process ends at block 1248. If the vehicle is continuing towards the destination, the autonomous driving computer determines whether the user is attempting to or actually leaving the route at block 1250. For example, if the vehicle is being operated in a manual mode, the user may drive the vehicle off or away from the route. If the vehicle is being operated in an autonomous or semi-autonomous mode, the user may take manual control of the vehicle from the autonomous driving computer or indicate that a deviation is needed as described above. If there are no attempts to leave the route, the vehicle continues to follow and/or display the generated, predetermined, or selected route at block 1244.

If the user is attempting to or actually leaving the route, the autonomous driving computer determines whether the identified profile indicates that the user has permission to deviate from the route. If not, and if the vehicle is operating in an autonomous mode, the autonomous driving computer may deny the user's ability to leave the route. If the vehicle is operating in a semi-autonomous mode, the vehicle may prevent the user from leaving the route by taking full control of the vehicle, warning the user, and/or recording a log of the user's actions. If the vehicle is being operated in a manual mode, the autonomous driving computer may respond by taking control of the vehicle autonomously, warning the user, and/or recording a log of the user's actions. If the user or the autonomous computer returns the vehicle to the route at block 1256, the process returns to block 1244 and the vehicle continues to follow and/or display the generated, predetermined, or selected route. If the user continues to attempt to or actually deviate from the route, the autonomous computer may again respond by taking control of the vehicle autonomously (if it has not already done so), warning the user, and/or recording a log of the user's actions at block 1254.

If the identified profile indicates that the user does have permission to leave the route, the autonomous driving computer may begin to calculate another or a new deviation value at block 1254. This may be calculated in real time either based on a proposed route identified by the user as described above or based on the user's control of the vehicle. At box 1256, the new deviation value is then compared to a maximum deviation value which may be the same or a different maximum deviation value as box 1236 of FIG. 12A. If the deviation value is greater than the maximum deviation value, the process returns to block 1254 to respond based on the current mode of the operation.

If the deviation value is less than or equal to the maximum deviation value, the autonomous driving computer may allow the deviation at block 1258. If the vehicle is being operated in a manual mode, the autonomous driving computer then continues to monitor whether the deviation value remains at or below the maximum deviation value. If not, the process again returns to block 1254 where the autonomous computer responds by taking control of the vehicle autonomously, warning the user, and/or recording a log of the user's actions.

The autonomous driving computer also monitors whether the user is attempting to deviate from the deviation at block 1260. If so, the process returns to block 1254 to determine the deviation value, etc. If the user does not attempt to deviate from the deviation, the process returns to block 1244 where the vehicle continues to follow and/or display the generated, predetermined, or selected route until reaching the destination. If the user leaves the vehicle at the destination and subsequently returns to the vehicle, the process returns to block 1206 of FIG. 12A and the user must provide identification information.

This type of vehicle may lend itself to a special licensing scheme where an individual is allowed to "operate" the vehicle under specific constraints with a special license which does not allow full manual driving or driving in particular locations. In this example, the constraints may be programmed into the user's profile. The vehicle itself may monitor the user's compliance with the constraints. For example, a teenager who is too young to qualify for a standard driver's license may be granted a special license to use the vehicle according to particular legal constraints. In another example, a newly licensed driver may be restricted legally from driving the vehicle at night, etc. Again, these constraints may be monitored and enforced by the vehicle based on the user's profile.

Autonomous vehicles, such as those having one or more features described herein, may also be shared by drivers, such as those having one or more features described herein. For example, a driver or owner may allow other users to access the autonomous vehicle to other drivers when the vehicle is not in use. The owner may charge a rental fee or taxiing fee to the other driver. The vehicle may charge the other driver's credit card or an account after identifying the other driver as described above.

When a person requires a vehicle, the person may send his or her location to a dispatching service, for example, a vehicle's computer or a remote server computer, and a vehicle may be dispatched to the person. For example, the person's location may be identified based on a position component of a mobile computer or phone and transmitted to the dispatching service. The vehicle may be dispatched by a central dispatching service controlling a fleet of autonomous vehicles or the vehicles may cooperate with one another to identify the closest available vehicle and dispatch it to the person. When the vehicle arrives, the person may be identified before providing access to the vehicle. Alternatively, a person may simply walk up to any autonomous vehicle that is available for rent, identify themselves, and then be granted access and/or control of the vehicle.

A vehicle may also be sent to a specific location automatically. For example, when not in use, fleet vehicles may return to locations where taxi services are generally in high demand such as airports or train stations. In another example, the driver may provide the computer with access to the driver's personal calendar. The vehicle may automatically dispatch itself to a location where the drive may be in order to pick up the driver and take him or her to the location of a calendar appointment.

As these and other variations and combinations of the features discussed above can be utilized without departing from the subject matter as defined by the claims, the foregoing description of embodiments should be taken by way of illustration rather than by way of limitation of the subject matter as defined by the claims. It will also be understood that the provision of the examples described herein (as well as clauses phrased as "such as," "e.g.", "including" and the like) should not be interpreted as limiting the claimed subject matter to the specific examples; rather, the examples are intended to illustrate only some of many possible aspects.

The invention claimed is:

1. A method comprising:
    determining, by one or more processors associated with a vehicle configured to operate in an autonomous driving mode, whether a user currently has permission to use the vehicle, including evaluating any date or time restrictions for the user according to profile data received for the user;
    obtaining, by the one or more processors, a destination for the vehicle to take the user;
    determining, by the one or more processors, whether the destination is a permissible destination based on the profile data;
    determining, by the one or more processors, whether there is a predefined route to the permissible destination;
    upon determining that there is a predefined route, the one or more processors determining whether the user has permission to take an alternate route to the permissible destination different from the predefined route;
    upon determining that the user has permission to take the alternate route, the one or more processors controlling driving of the vehicle to the permissible destination either autonomously or semi-autonomously via the alternate route; and
    upon determining that the user does not have permission to take the alternate route, the one or more processors controlling driving of the vehicle to the permissible destination either autonomously or semi-autonomously via the predefined route.

2. The method of claim 1, wherein determining whether the user has permission to take an alternate route is based on the profile data.

3. The method of claim 1, further comprising:
    determining whether the user is attempting to leave the predefined route or the alternate route while the vehicle is driving towards the permissible destination;
    upon determining that the user is attempting to leave the predefined route or the alternate route, calculating a deviation value; and
    determining whether the calculated deviation value exceeds a threshold.

4. The method of claim 3, wherein upon determining that the calculated deviation value exceeds a threshold, changing a driving mode of operation of the vehicle from:
    a semi-autonomous driving mode to the autonomous driving mode,
    wherein in the autonomous driving mode the vehicle is driven without input from the user.

5. The method of claim 1, wherein upon determining whether the user has permission to take an alternate route, the method further includes identifying one or more alternate routes.

6. The method of claim 5, further comprising:
    determining a deviation value for each identified alternate route.

7. The method of claim 6, wherein when the deviation value for a given one of the identified alternate routes is less than or equal to a maximum deviation value, the method further includes generating a display of the given alternate route.

8. The method of claim 5, wherein the one or more alternate routes are identified based on traffic conditions, duration, and distance.

9. The method of claim 1, further comprising when the user does not have permission to take the alternate route and the one or more processors control driving of the vehicle to the permissible destination autonomously:
    determining that the user is attempting to leave the predefined route; and
    denying the user's ability to leave the predefined route by continuing along the predefined route autonomously.

10. The method of claim 1, further comprising when the user does not have permission to take the alternate route and the one or more processors control driving of the vehicle to the permissible destination semi-autonomously or manually:
    determining that the user is attempting to leave the predefined route; and
    prevent the user's ability to leave the predefined route by taking full autonomous control of the vehicle.

11. A method comprising:
    evaluating, by one or more processors associated with a vehicle configured to operate in an autonomous driving mode, permission data provided by an authorized user indicating whether a passenger other than the authorized user has permission to use the vehicle, the permission data including information about the passenger and at least one of a permissible destination, a restricted destination, and one or more routes to the permissible and restricted destinations;
    obtaining, by the one or more processors, a destination for the vehicle to take the passenger;
    determining, by the one or more processors, whether the obtained destination is a currently permissible destination for the passenger based on the permission data, including any age-related restrictions for the passenger stored in the permission data;
    upon determining that the obtained destination is a currently permissible destination, controlling driving of the vehicle to the currently permissible destination in an autonomous driving mode; and upon determining that the obtained destination is not a currently permissible destination, providing a notification to the passenger.

12. The method of claim 11, further comprising:
identifying the passenger based on user identification information; and
upon identifying the passenger, accessing the permission data to determine that the passenger has permission to currently use the vehicle.

13. The method of claim 11, wherein the authorized user is a parent or guardian and the passenger is a child of the parent or guardian.

14. The method of claim 11, wherein determining whether the obtained destination is a currently permissible destination for the passenger based on the permission data includes evaluating one or more date or time restrictions associated with an age of the passenger.

15. The method of claim 14, wherein the one or more date or time restrictions includes a specific period of time during which the passenger is not permitted to travel.

16. The method of claim 11, wherein determining whether the obtained destination is a currently permissible destination for the passenger based on the permission data includes evaluating whether there are any restricted areas through which the passenger is not permitted to travel.

17. The method of claim 11, wherein determining whether the obtained destination is a currently permissible destination for the passenger based on the permission data includes evaluating whether there are any restricted routes along which the passenger is not permitted to travel.

18. The method of claim 17, wherein the restricted routes include one or more of a group consisting of highways, high traffic areas, and school zones.

19. The method of claim 11, wherein determining whether the obtained destination is a currently permissible destination for the passenger based on the permission data includes evaluating whether a Cinderella licensing law is applicable to the passenger.

20. The method of claim 11, wherein the notification is a denial or warning message.

\* \* \* \* \*